(12) United States Patent
Watanuki et al.

(10) Patent No.: US 6,853,639 B1
(45) Date of Patent: Feb. 8, 2005

(54) INFORMATION RELAY DEVICE AND METHOD WITH MULTICAST PROTOCOL CONVERSION FUNCTION AND INFORMATION NETWORK SYSTEM USING THE SAME

(75) Inventors: Tatsuya Watanuki, Ebina (JP); Shinji Nozaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/421,275

(22) Filed: Oct. 20, 1999

(30) Foreign Application Priority Data

Oct. 21, 1998 (JP) .......................................... 10-299613

(51) Int. Cl.[7] .............................................. H04L 12/28
(52) U.S. Cl. ..................................................... 370/390
(58) Field of Search ................................ 370/390–392, 370/355, 448, 389, 374; 316/352–355; 466/270, 337–349, 389, 432; 484/486, 332–339, 474, 401–416, 316, 413, 230–235, 210, 351, 221; 375/240.05, 240, 259; 709/203, 238, 245

(56) References Cited

U.S. PATENT DOCUMENTS

| | | | | |
|---|---|---|---|---|
| 4,791,639 A | * | 12/1988 | Afheldt et al. ............... | 370/374 |
| 5,566,170 A | * | 10/1996 | Bakke et al. ................ | 370/392 |
| 5,724,345 A | * | 3/1998 | Guarneri et al. ............. | 370/316 |
| 5,903,559 A | * | 5/1999 | Acharya et al. .............. | 370/355 |
| 6,069,889 A | * | 5/2000 | Feldman et al. ............. | 370/351 |
| 6,101,180 A | * | 8/2000 | Donahue et al. ............. | 370/352 |
| 6,192,053 B1 | * | 2/2001 | Angelico et al. ............ | 370/448 |
| 6,226,686 B1 | * | 5/2001 | Rothschild et al. .......... | 709/245 |
| 6,343,326 B2 | * | 1/2002 | Acharya et al. ............. | 709/238 |
| 6,400,729 B1 | * | 6/2002 | Shimadoi et al. ............ | 370/466 |
| 6,490,285 B2 | * | 12/2002 | Lee et al. .................... | 370/395 |
| 6,570,875 B1 | * | 5/2003 | Hegde ......................... | 370/389 |

OTHER PUBLICATIONS

B. Cain et al, "Internet Group Management Protocol, Ver. 3", Internet Engineering Task Force—Internet–Draft, Feb. 1999, pp. 1–33.

W. Fenner, "Internet Group Management Protocol, Version 2", Nov. 1997, pp. 1–24.

S. Deering, "Host Extensions for IP Multicasting", Aug. 1989, pp. 1–17.

"GARP Multicast Registration Protocol (GMRP)", Media Access Control (MAC) Bridges—Traffic Class Expediting and Dynamic Multicast Filtering, May 25, 1998, pp. 133–140.

D. Waitzman et al, "Distance Vector Multicast Routing Protocol", Nov. 1988, pp. 1–24.

D. Estrin et al, "Protocol Independent Multicast—Sparse Mode (PIM–SM): Protocol Specification", Jun. 1988, pp. 1–66.

J. Moy, "MOSPF: Analysis and Experience", Mar. 1994, pp. 1–13.

A. Ballardie, "Core Based Trees (CBT Version 2) Multicast Routing—Protocol Specification", Sep. 1997, pp. 1–23.

S. Deering, "Multicast Listener Discovery (MLD) for IPv6", Jun. 1999, pp. 1–23.

Cisco Systems, Inc., "IP Multicasting—Module 9—CGMP", 1998, pp. 1–40.

* cited by examiner

Primary Examiner—Chi Pham
Assistant Examiner—Prenell Jones
(74) Attorney, Agent, or Firm—Mattingly, Stanger & Malur, P.C.

(57) ABSTRACT

An information relay device connected between a plurality of logical or physical networks for performing an operation for relay of information between the networks is provided with a transmit/receive processing unit for receiving a general purpose multicast message from one of the plurality of networks and transmitting a multicast message to at least one of the plurality of networks, and a protocol conversion processing unit for converting, in the case where the general purpose multicast message received by the transmit/receive processing unit is a multicast protocol message of a certain level layer, the multicast protocol message of the certain level layer into a multicast protocol message of another level layer.

16 Claims, 21 Drawing Sheets

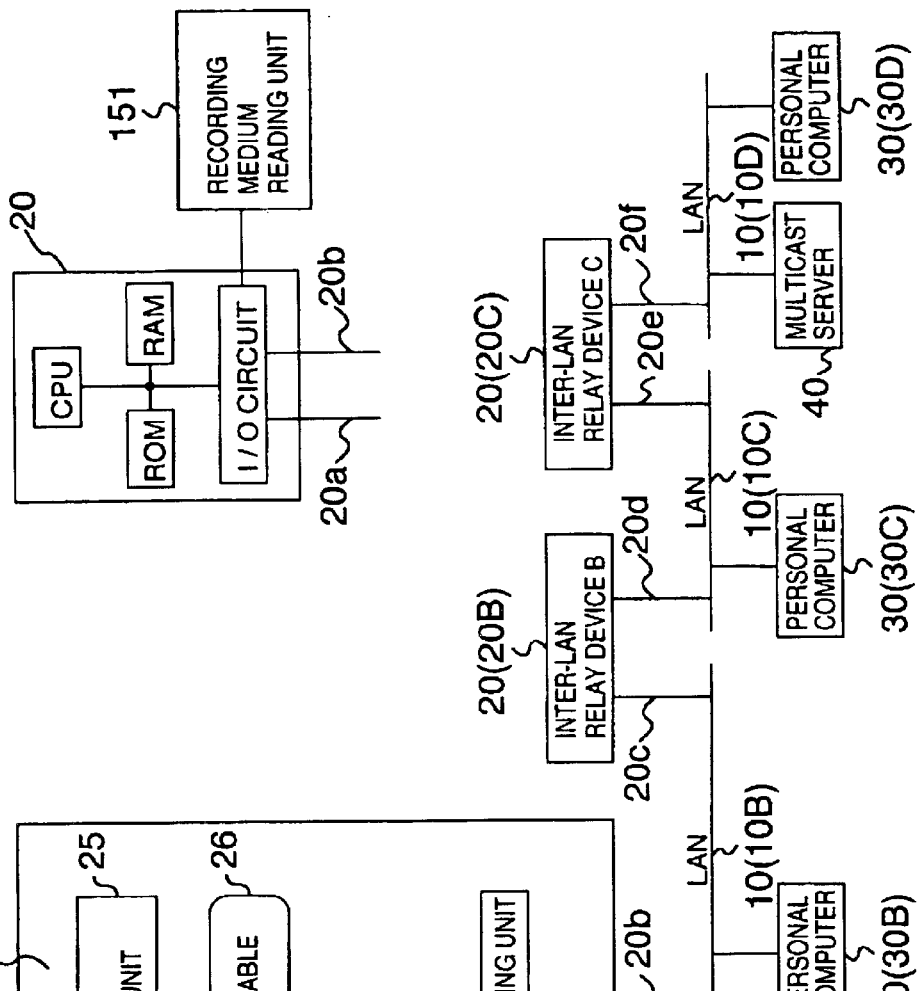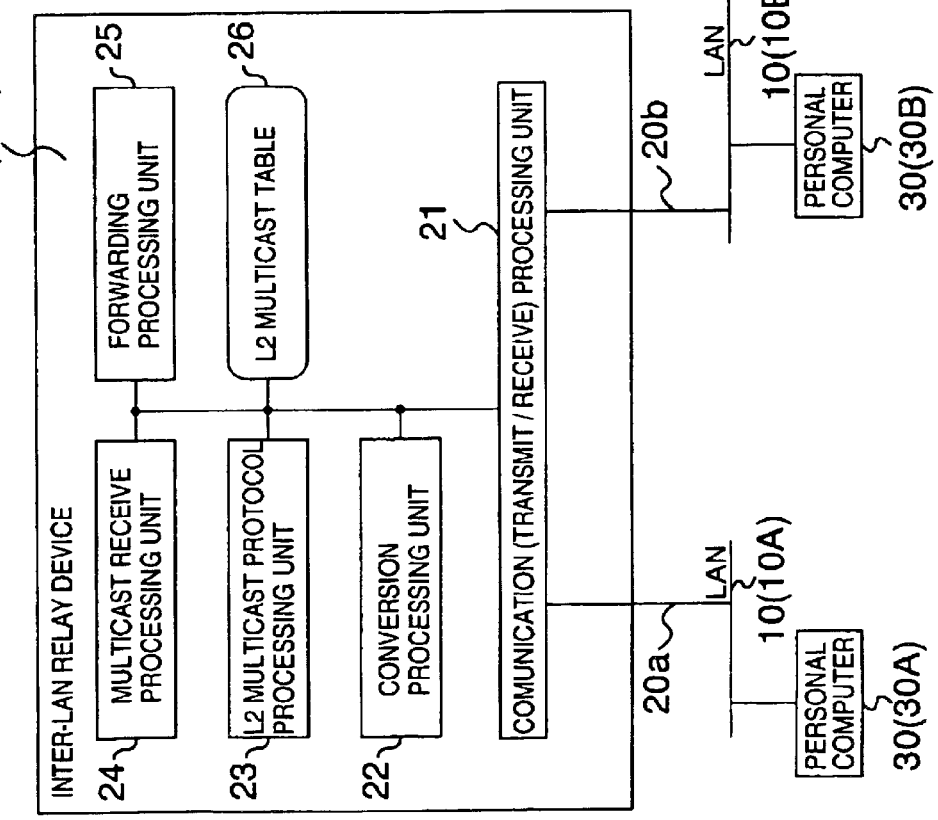

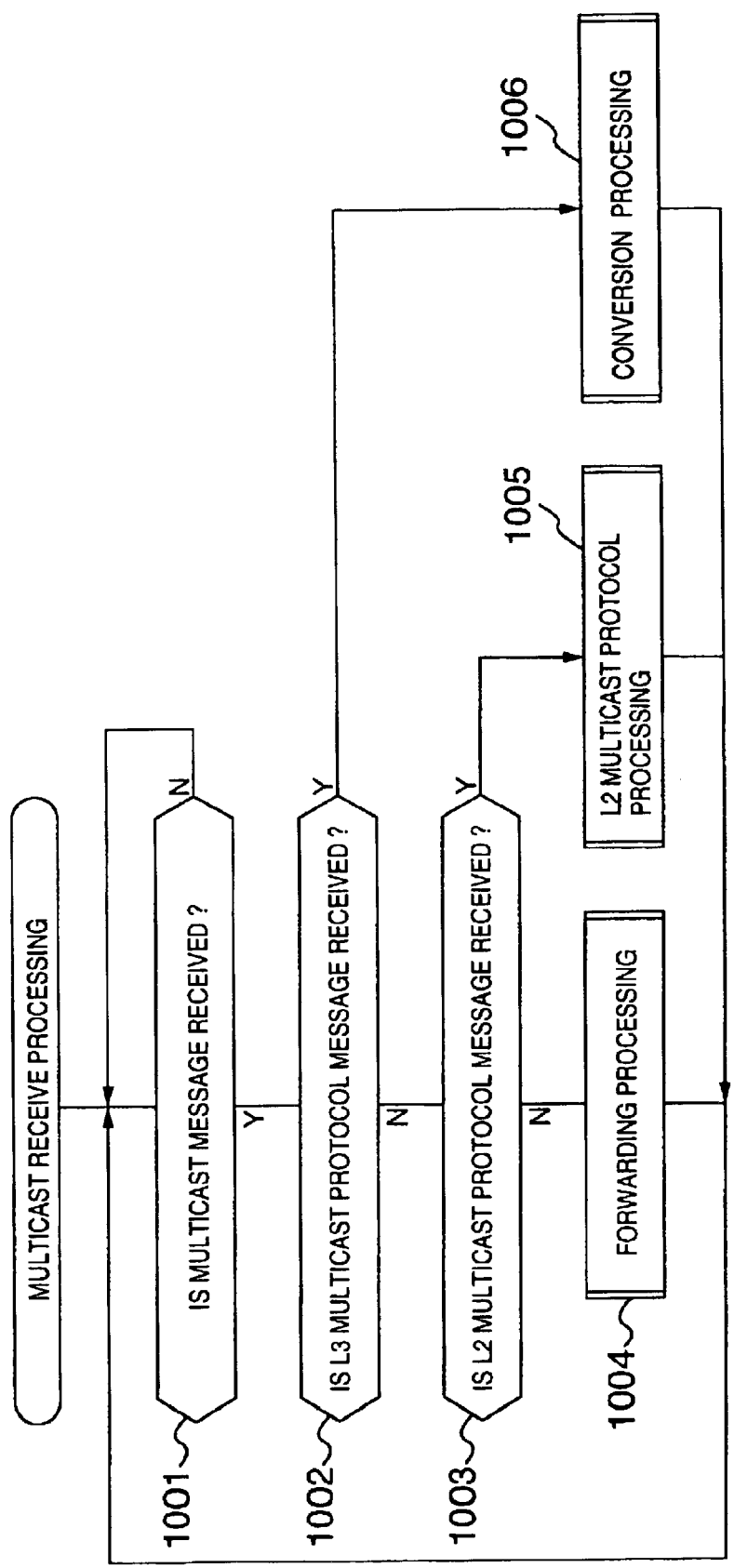

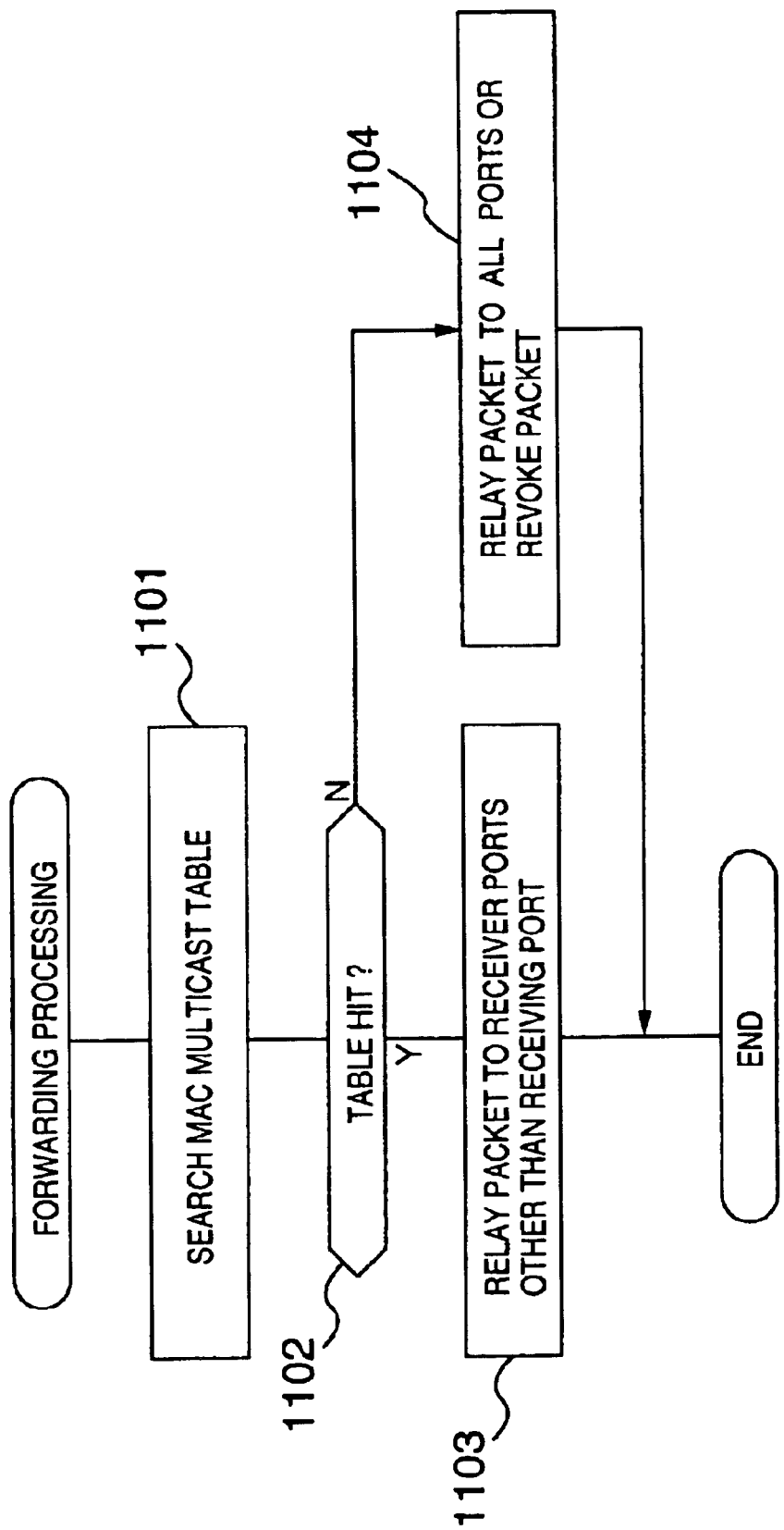

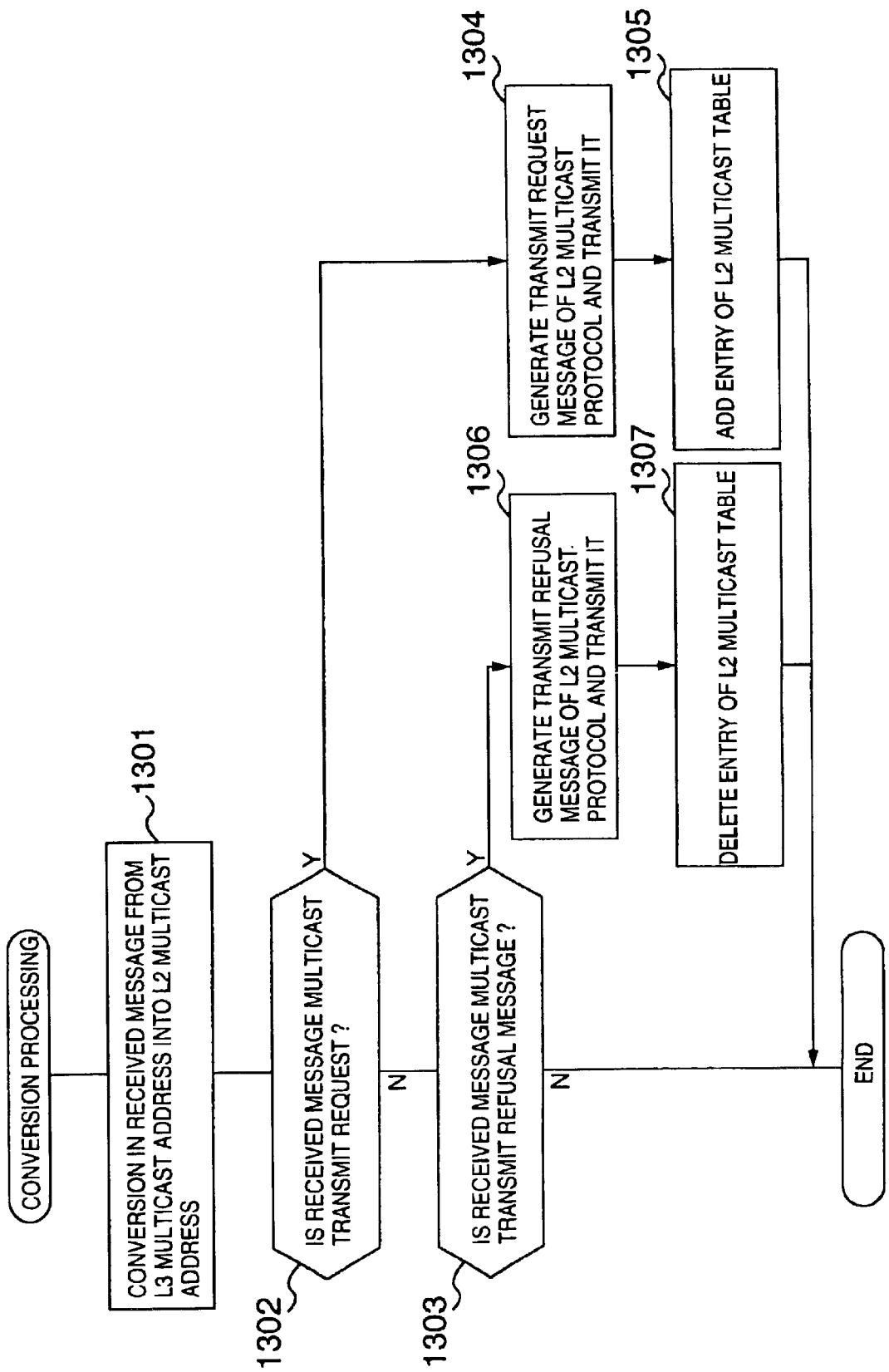

L2 MULTICAST TABLE

| L2 MULTICAST ADDRESS | RECEIVER PORT |
|---|---|
| 01-00-5E-00-00-10 | 1,3 |
| 01-00-5E-00-00-20 | 1,3,5 |
| ... | ... |

IGMP MESSAGE FORMAT

TYPE OF IGMP MESSAGE

| TYPE VALUE | TYPE |
|---|---|
| 0x11 | Membership Query |
| 0x12 | Version1 Membership Report |
| 0x16 | Version2 Membership Report |
| 0x17 | VErsion2 Leave Group |
| 0x22 | Version3 Membership Report |

GMRP MESSAGE FORMAT

TYPE OF GMRP MESSAGE

| TYPE VALUE | TYPE |
|---|---|
| 0x0 | LeaveAll |
| 0x1 | JoinEmpty |
| 0x2 | JoinIn |
| 0x3 | LeaveEmpty |
| 0x4 | LeaveIn |
| 0x5 | Empty |

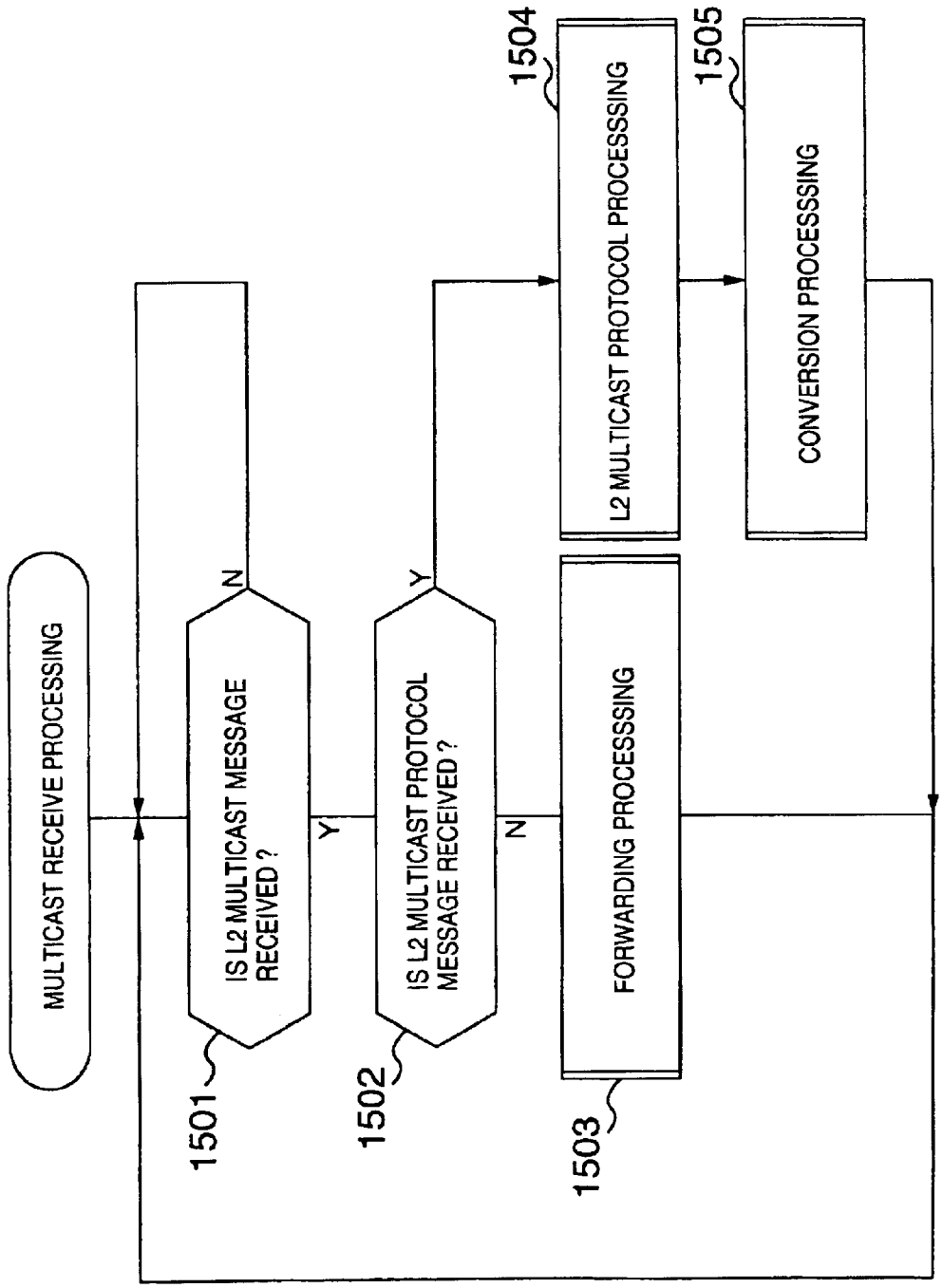

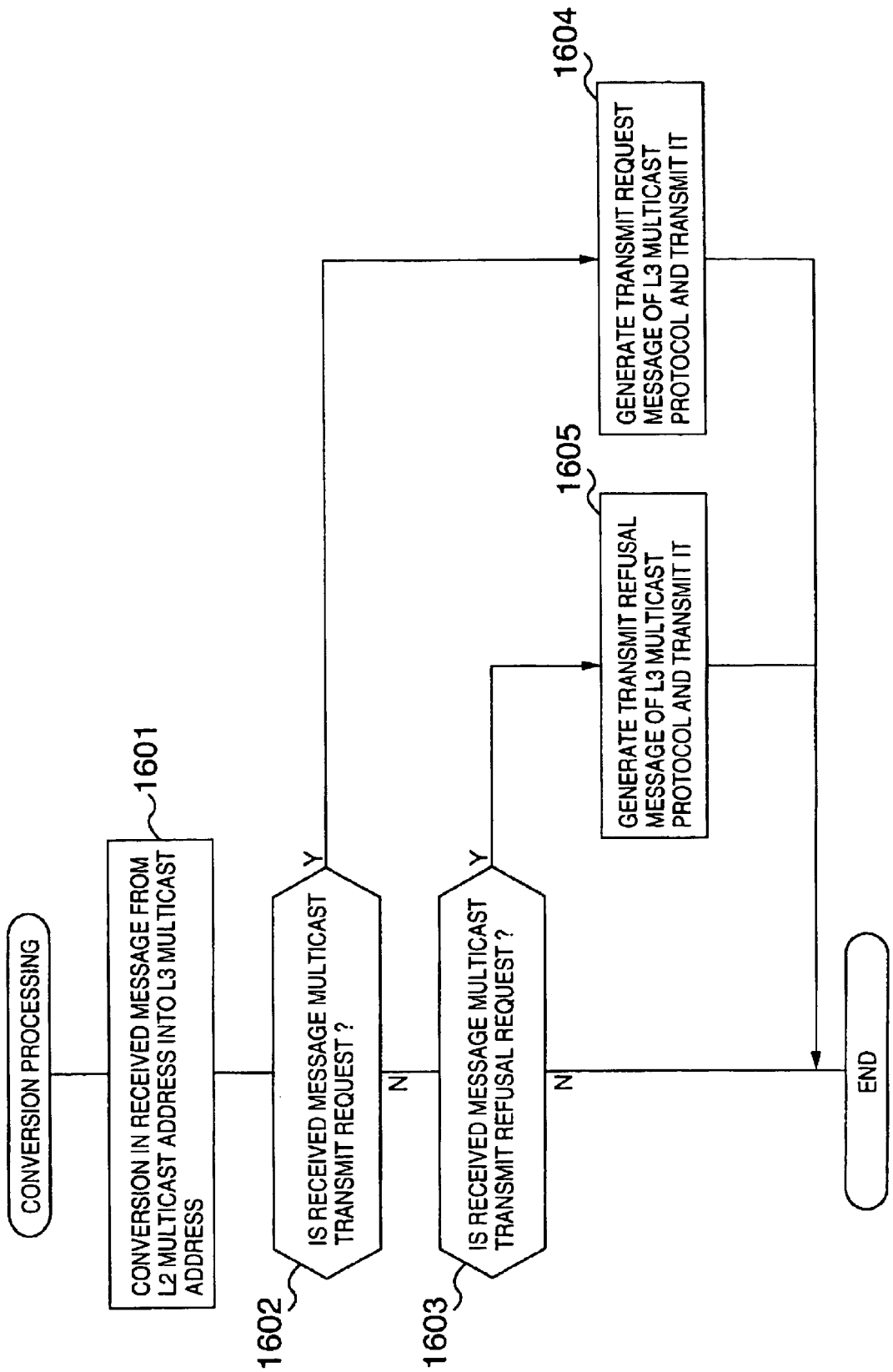

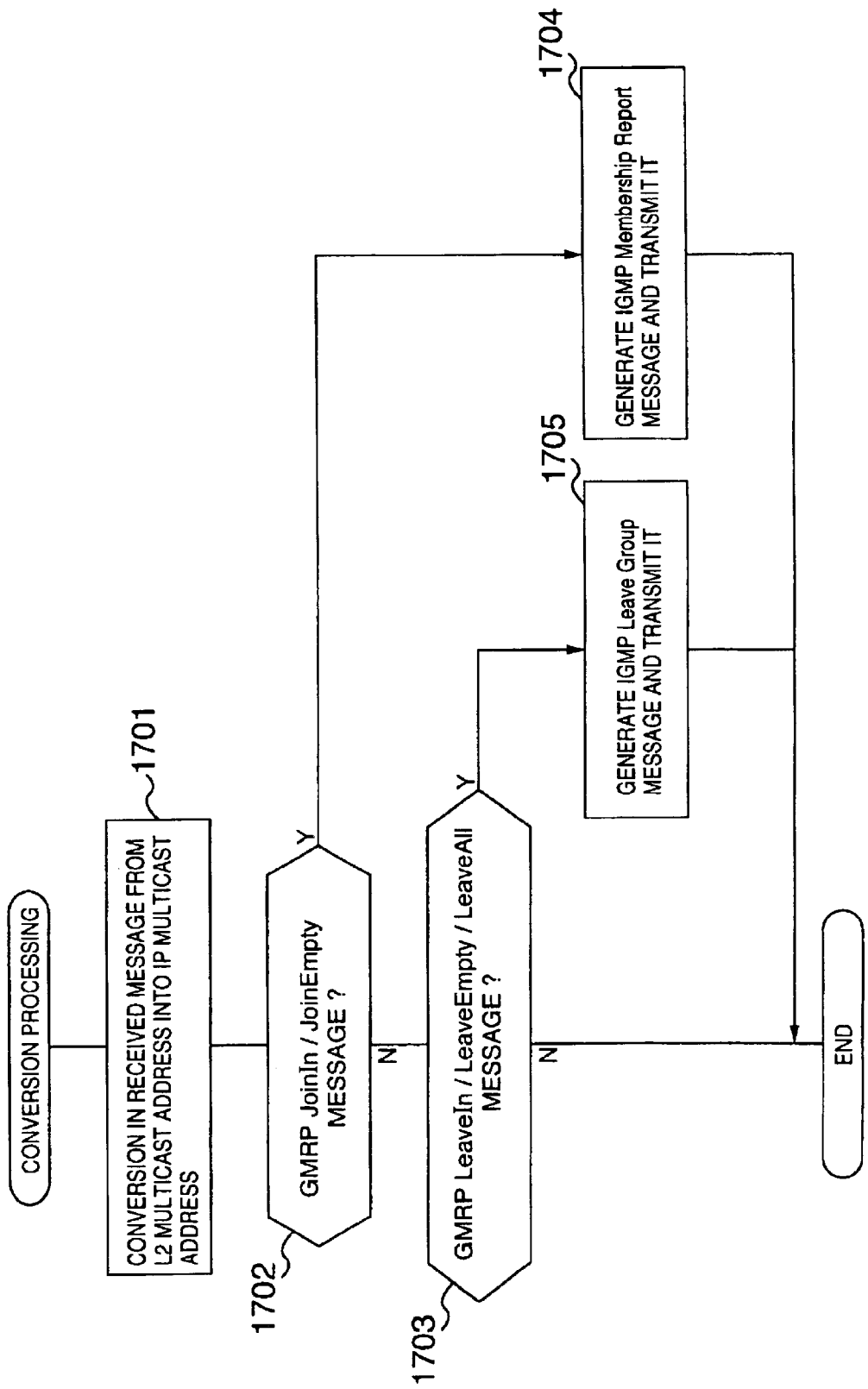

IPv6 MULTICAST ADDRESS

FIG.20

TABLE FOR CONVERSION BETWEEN L2 AND L3
MULTICAST PROTOCOL MESSAGES

150

| L3 PROTOCOL \ L2 PROTOCOL | | GMRP | |
|---|---|---|---|
| GROUP JOIN / LEAVE PROTOCOL | IGMP | Join | Leave |
| | MLD | Membership Report | Leave Group |
| ROUTING PROTOCOL | DVMRP | Multicast Listener Report | Multicast Listener Done |
| | PIM-SM | Graft | Prune |
| | PIM-DM | Join / Prune | Join / Prune |
| | CBT | Graft | Join / Prune |
| | MOSPF | JOIN_REQUEST | QUIT_NOTIFICATION |
| | | Group-membership-LSA | — |

PIM-DM/PIM-SM MESSAGE FORMAT

CBT MESSAGE FORMAT

MOSPF MESSAGE FORMAT

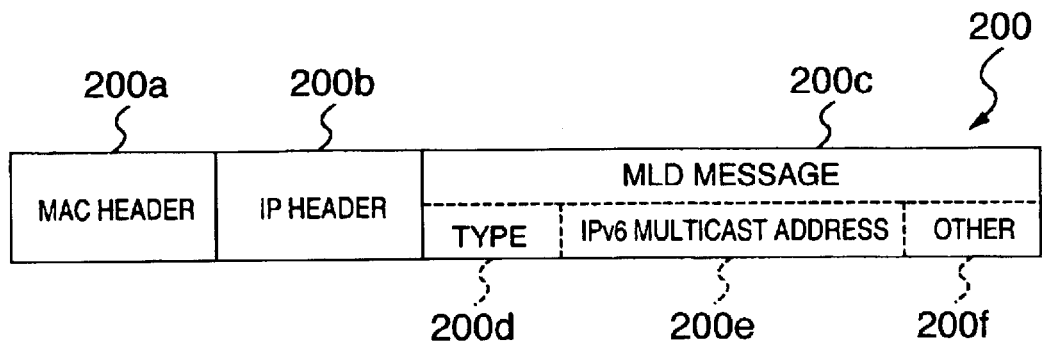

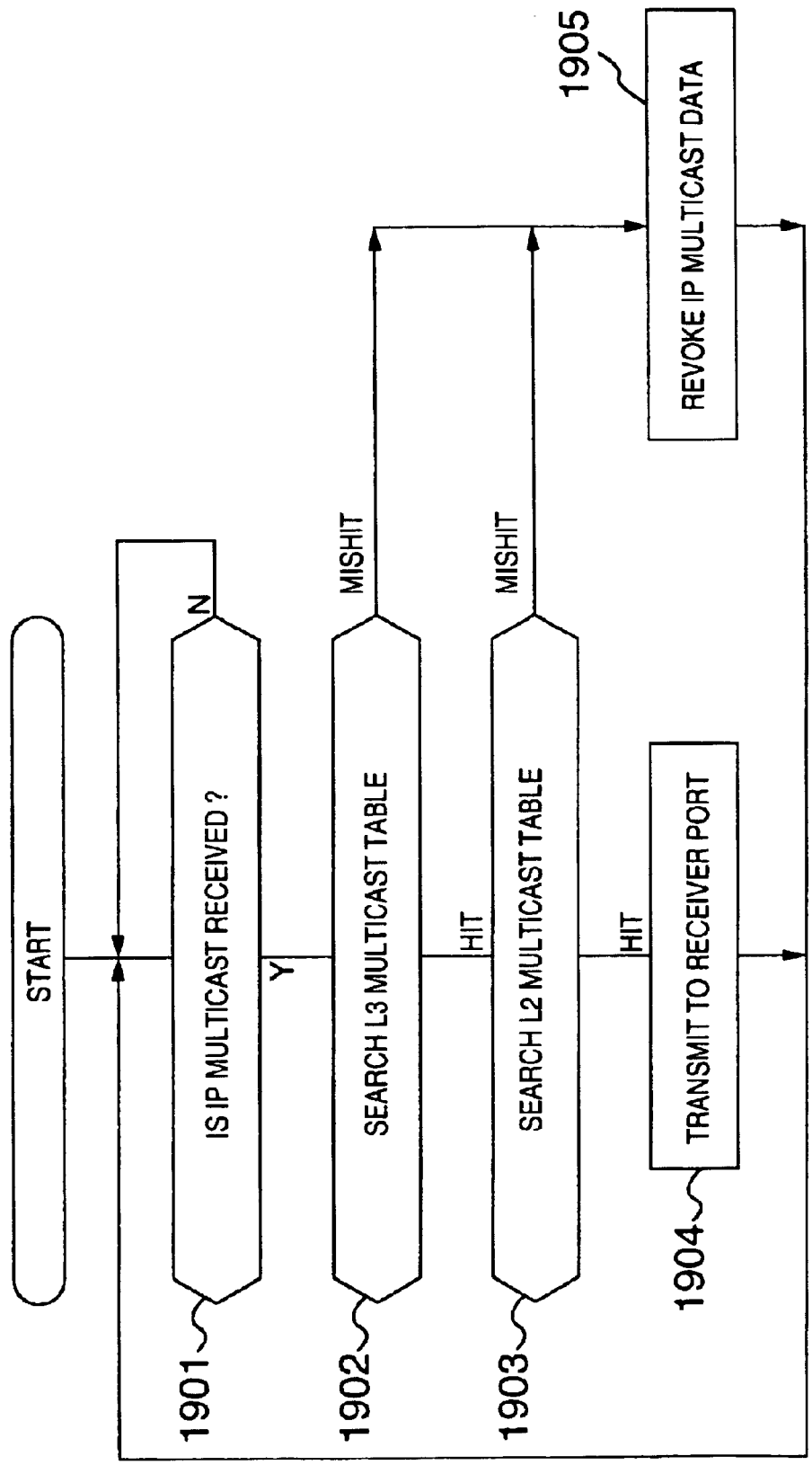

INFORMATION RELAY DEVICE AND METHOD WITH MULTICAST PROTOCOL CONVERSION FUNCTION AND INFORMATION NETWORK SYSTEM USING THE SAME

BACKGROUND OF THE INVENTION

The present invention relates to an information relay device and method in which an operation for relay of information between a plurality of logical or physical information networks is performed and an information network system which uses such a device or method, and more particularly to an information relay device such as a bridge, router or LAN switch provided with a multicast protocol conversion function in which an operation for relay of multicast information between information networks is performed, an information relay method which is used in such a device and an information network system which uses such a device or method.

For example, in the field of information communication, a method called multicast communication (or transmission) is generally known as a method for performing the simultaneous delivery (or transmission) of the same data from one host to a plurality of hosts. In the multicast communication, one group is formed by a plurality of hosts and the same data is delivered to all hosts in this group by use of one multicast packet. Also, in TCP/IP (Transmission Control Protocol/Internet Protocol) as a standard protocol in the Internet, there is a technique called IP multicast in which the above multicast communication is used.

In the IP multicast, a specified IP address called IP multicast address is defined for each group and data is delivered to each host by use of an IP multicast packet with the IP multicast address taken as a receiver (or destination) IP address.

As one protocol for IP multicast, there is IGMP (Internet Group Management Protocol) described in RFC (Request For Comment) 1112, 2236 and draft (whose last edition on February 1999 is draft-ietf-idmr-igmp-v3-01.txt). The IGMP is a protocol for a request for multicast communication which is made from a host to an adjacent router. With the IGMP, the host is enabled to receive an IP multicast packet.

The IGMP is a protocol in the third layer (or network layer) of an OSI (Open Systems Interconnect) reference model.

On the other hand, GMRP (GARP (Generic Attribute Registration Protocol) Multicast Registration Protocol) described in IEEE (Institute of Electrical and Electronics Engineers) 802.1d draft (whose last edition on June 1998 is IEEE802.1d/D17) exists as one protocol for multicast communication in the second layer (or data link layer) of the OSI reference model.

The GMRP is a protocol for a request for multicast communication in the data link layer which is made from a host to an adjacent bridge or LAN (Local Area Network) switch. With the GMRP, the host is enabled to receive a multicast packet in the data link layer. Hereinafter, this multicast packet in the data link layer will be referred to gas MAC (Media Access Control) multicast packet. A difference between the IGMP and the GMRP lies in that the IGMP is a protocol specified for IP whereas the GMRP is a protocol independent of the network layer.

SUMMARY OF THE INVENTION

The former protocol IGMP mentioned above is standard-wise mounted on, for example, WINDOWS 95, or the like which has come into wide use as an OS for a personal computer or the like. Therefore, the IGMP has a merit that it can easily be utilized. However, since the multicast is performed with an IP address, as mentioned above, it is not possible to perform, for example, delivery or transmission with a construction in an IP subnet taken into consideration. Namely, a multicast packet from a multicast server is equally relayed to not only a host in an IP subnet making a declaration of joining to multicast but also all switches and hosts in the IP subnet to which the declaring host belongs. Accordingly, there is a technical problem that an unavailing traffic in the IP subnet increases due to the multicast.

A demand for control/reduction of a traffic caused from the multicast becomes greater when the wide use of so-called push type information delivery services using a multicast function in the Internet or the like is taken into consideration.

In the latter protocol GMRP, on the other hand, the multicast is performed with a MAC address. Therefore, a relay device can selectively relay a multicast packet to only a host making a declaration of joining to the multicast (or a port to which the declaring host is connected), thereby making it possible to avoid the generation of an unavailing traffic. However, a prerequisite is that the GMRP's are mounted on all relay devices or hosts connected to the network. Accordingly, there is a technical problem that easy/convenient wide use or utilization is difficult. Namely, since the number of hosts such as existing personal computers connected to information networks with the wide use of the Internet or the like is very large, it is practically difficult to expect the mounting of GMRP's on all these hosts.

An object of the present invention is to provide an information relay device and an information relay method which makes it possible to realize a multicast service without increasing the traffic of a network beyond the requisite amount thereof, and an information network system which uses such a device or method.

Another object of the present invention is to provide an information relay device and an information relay method which makes it possible to realize the simplification of mounting of multicast software in a host connected to a network and utilizing a multicast service, and an information network system which uses such a device or method.

A further object of the present invention is to provide an information relay device and an information relay method which compatibly enables the suppression of a traffic increase of a network caused from a multicast service and the easy/convenient realization and utilization of the multicast service, and an information network system which uses such a device or method.

A still further object of the present invention is to provide an information relay device and an information relay method which compatibly enables the simplification of mounting of multicast software in a host connected to a network and the utilization of a variety of multicast protocols, and an information network system which uses such a device or method.

To that end, in the present invention, an information relay device for performing an operation for relay of information between a plurality of logical or physical networks is provided with a multicast protocol conversion unit for making conversion between different multicast protocols which function in different level layers of a general purpose multicast message protocol, for example, different layer levels of an OSI reference model.

According to one aspect of the present invention, an information relay device connected between a plurality of logical or physical networks for performing an operation for relay of information between the networks includes a transmit/receive processing unit for receiving a general purpose multicast message from one of the plurality of networks and transmitting a multicast message to at least one of the plurality of networks, and a protocol conversion processing unit for converting, in the case where the general purpose multicast message received by the transmit/receive processing unit is a multicast protocol message of a certain layer, the multicast protocol message of the certain level layer into a multicast protocol message of another level layer.

With the information relay device of the present invention having such a construction, there is obtained an effect that a multicast service can be realized without increasing the traffic of a network beyond the requisite amount thereof.

Also, there is obtained an effect that the simplification of mounting of multicast software in a host connected to a network and utilizing a multicast service can be realized.

Also, there is obtained an effect that the suppression of an increase in traffic in a network caused from a multicast service and the easy/convenient realization and utilization of the multicast service are compatibly enabled.

Also, there is obtained an effect that the simplification of mounting of multicast software in a host connected to a network and the utilization of a variety of multicast protocols are compatibly enabled.

According to an example of the present invention, when a multicast protocol (IGMP, DVMRP, MOSPF, PIM-SM, PIM-DM, CBT, MLD or the like) message in the third layer (or network layer) of an OSI reference model is received, the protocol conversion processing unit converts this message into a multicast protocol (GMRP or the like) message in the second layer (or data link layer) and transmits the converted message.

According to another example of the present invention, when a multicast protocol (GMRP or the like) message in the second layer (or data link layer) is received, the protocol conversion processing unit converts this message into a multicast protocol (IGMP, DVMRP, MOSPF, PIM-SM, PIM-DM, CBT, MLD or the like) message in the third layer (or network layer) and transmits the converted message.

According to a further example of the present invention, there is provided with a function of performing the conversion from a multicast protocol in the second layer (or data link layer) into a multicast protocol in the third layer (or network layer) for all possible combinations of protocols.

According to a still further example of the present invention, a conversion table is provided, as required, so that the conversion from a multicast protocol in the second layer (or data link layer) into a multicast protocol in the third layer (or network layer) is made using a prefix portion of a multicast address registered in the conversion table beforehand.

According to a furthermore example of the present invention, a unit for monitoring a multicast packet flowing in a network and a conversion table are provided so that a prefix portion of a multicast address of the monitored multicast packet is registered into the conversion table and the conversion from a multicast protocol in the second layer (or data link layer) into a multicast protocol in the third layer (or network layer) is made using the prefix portion the multicast address registered in the conversion table.

BRIEF DESCRIPTION OF THE DRAWINGS

FIGS. 1A and 1B are block diagrams showing an example of the construction of an information network system including an inter-LAN relay device according to an embodiment of an information relay device of the present invention;

FIG. 2 is a flow chart showing an example of a multicast receive processing accompanied with a processing for conversion from L3 multicast protocol into L2 multicast protocol in the information relay device of the present invention;

FIG. 3 is a flow chart showing an example of a forwarding processing in L2 multicast in the information relay device of the present invention;

FIG. 4 is a flow chart showing an example of a general processing for conversion from L3 multicast protocol into L2 multicast protocol in the information relay device of the present invention;

FIG. 13 is a flow chart showing an example of a receive processing in a general processing for conversion from L2 multicast protocol into L3 multicast protocol in the information relay device of the present invention;

FIG. 14 is a flow chart showing an example of the general processing for conversion from L2 multicast protocol into L3 multicast protocol in the information relay device of the present invention;

FIG. 15 is a flow chart showing an example of a conversion processing in the information relay device of the present invention in the case where an L2 multicast protocol is GMRP and an L3 multicast protocol is IGMP;

FIG. 20 shows an example of a relationship in conversion between L2 multicast protocol and L3 multicast protocol in the information relay device of the present invention;

FIG. 26 shows an example of a message format of MLD which is an example of the L3 multicast protocol;

FIG. 27 shows an L3 multicast table in the information relay device of the present invention;

FIG. 28 is a flow chart showing an example of a processing for relay of a multicast packet in the information relay device of the present invention;

DESCRIPTION OF THE EMBODIMENTS

Figures 5, 6, 7:
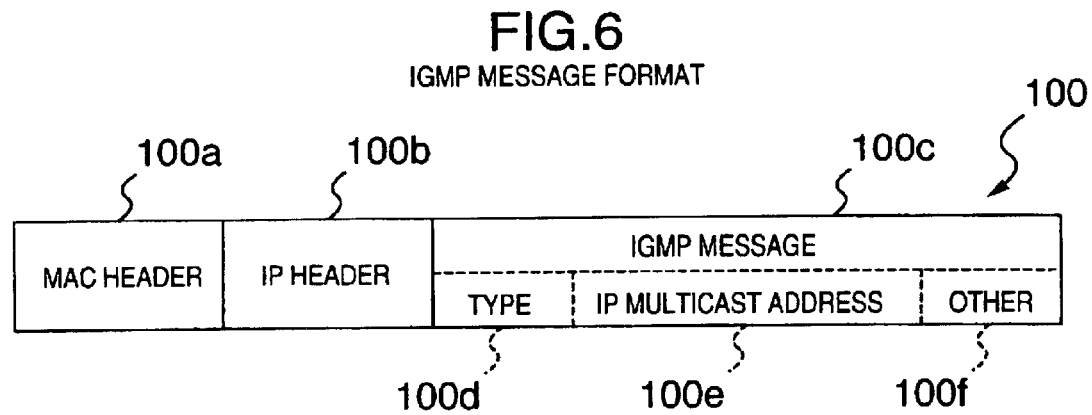
FIG. 5 is a diagram showing an example of an L2 multicast table in the information relay device of the present invention.
FIG. 6 shows an example of a message format of IGMP which is an example of a multicast protocol of L3 level.
FIG. 7 is a diagram showing examples of the type of an IGMP message.

Embodiments of an information relay device and method according to the present invention and an information network system using the same will now be described in reference to the accompanying drawings.

FIG. 1A is a block diagram showing an example of the construction of an information network system including an inter-LAN relay device which is an embodiment of an information relay device according to the present invention.

In the following description, a conversion between a multicast protocol in the second layer (or data link layer) of an OSI reference model and a multicast protocol in the third layer (or network layer) thereof will be described as an example of a conversion processing performed by the inter-LAN relay device. In the following, the second layer (or data link layer) and the third layer (or network layer) will be denoted by L2 and L3, respectively. Also, the multicast protocols in the second and third layers will be denoted by L2 and L3 multicast protocols, respectively.

The information network system in the present embodiment is constructed by a plurality of logical or physical networks, for example, local area networks (LAN's) 10 (four LAN's 10A, 10B, 10C and 10D in the example shown in FIG. 1), a plurality of inter-LAN relay devices 20 (three inter-LAN relay devices 20A, 20B and 20C in the example shown in FIG. 1) each connected between the LAN's for performing the operation of relay of information between the LAN'S, terminals 30 (four terminals 30A, 30B, 30C and 30D in the example shown in FIG. 1) such as personal computers or hosts connected to the respective LAN's 10, at least one multicast server 40 connected to any one of the LAN's 10A to 10D for performing multicast packet data communication, and so forth.

In the present embodiment, each inter-LAN relay device 20 includes, for example, a communication (or transmit/receive) processing unit 21, a conversion processing unit 22, an L2 multicast protocol processing unit 23, a multicast receive processing unit 24, a forwarding processing unit 25, and an L2 multicast information memory, for example, an L2 multicast table 26.

The communication processing unit 21 controls the communication of information with the corresponding LAN (10A, 10B, etc.) and the external device such as the personal computer 30 or the server 40 through a plurality of ports (20a, 20b, etc.) of the inter-LAN relay device 20.

The conversion processing unit 22 performs a processing for conversion for a received multicast message from an L3 multicast protocol into an L2 multicast protocol through a processing shown by, for example, a flow chart exemplified in FIG. 4 which will be described later on.

The L2 multicast protocol processing unit 23 performs a processing for an L2 multicast protocol such as GMRP, as will be described later on in reference to FIG. 11.

The multicast receive processing unit 24 performs an operation for distribution to a forwarding processing, an L2 multicast protocol processing, a conversion processing and so forth in accordance with the type of a multicast packet through a processing shown by, for example, a flow chart exemplified in FIG. 2 which will be described later on.

The forwarding processing unit 25 performs an operation of transmitting received relay data to a predetermined receiver (or destination for transmission) as it is.

The L2 multicast table 26 has a column 26a indicative of an L2 multicast address and a column 26b indicative of a receiver port (or the port of destination for transmission) which corresponds to the L2 multicast address of the column 26a and to which a terminal 30 making a declaration of utilization of a multicast service is connected, as exemplified in FIG. 5.

Each inter-LAN relay device 20 may be constructed by either hardware or software. In the case where the inter-LAN relay device 20 is constructed by hardware, the processing units 21 to 25 and the table (or memory) 26 may formed by, for example, discrete ASIC's (Application Specific Integrated Circuits) or a single ASIC. In the case where the inter-LAN relay device 20 is constructed by software, the device 20 may be formed by a CPU, a ROM, a RAM and an I/O (input/output) circuit, as shown in FIG. 1B, so that the processing units 22 to 25 are formed by software in the ROM (for example, a program module), the processing unit 21 is formed by software in the ROM (for example, a program module) and the I/O circuit and the table 26 is formed by a part of the ROM or RAM.

An example of the operation of each inter-LAM relay device 20 in the present embodiment will now be described. Though the following description will be made in conjunction with an example of the operation of the inter-LAM relay device 20A, the similar operation holds for the other inter-LAM relay devices 20.

First, the operation of the multicast receive processing unit 24 will be described referring to a flow chart shown in FIG. 2.

The monitoring is first made of whether or not a multicast message is received (step 1001). More particularly, an MAC header of a message received from the server 40 or the personal computer 30 through the LAN 10 and the port is examined to check whether or not the received message is an L2 or L3 multicast message. Namely, if a multicast address (such as an address 01-00-5E as shown in FIG. 5) is included in the MAC header, the judgement of the multicast message as being received is made.

In the case where the judgement of the multicast message as being not received is made, the processing is completed and a wait is taken for the next message to be received.

In the case where the judgement of the multicast message as being received is made, the judgement is made of whether or not an L3 multicast protocol message as a protocol control message is received (step 1002). More particularly, the MAC header and an IP header of the received message are examined to check whether or not the received message has an L3 multicast protocol message. Namely, in the case where the received message includes an L3 multicast protocol (for example, IGMP), an MAC header 110a and an IP header 100b of an IGMP message format 100 shown in FIG. 6 are examined to check whether or not the received message is an L3 multicast protocol message.

In the case where the judgement of the L3 multicast protocol message as being received is made, a processing for converting the L3 multicast protocol message into an L2 multicast protocol message is performed (step 1006), as will be described later on in reference to FIG. 4.

Figures 8, 9:
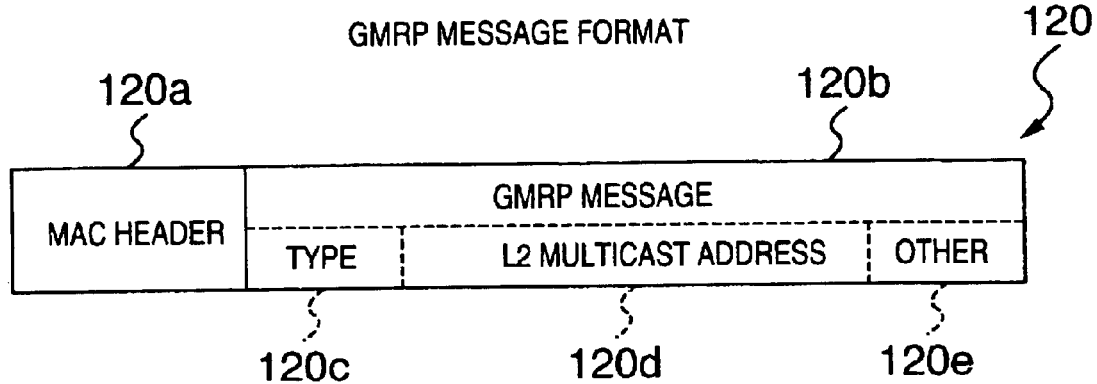
FIG. 8 shows an example of a message format of GMRP which is an example of a multicast protocol of L2 level.
FIG. 9 is a diagram showing examples of the type of a GMRP message.

In the case where the judgement of the L3 multicast protocol message as being not received is made in step 1002, the judgement is made of whether or not an L2 multicast protocol message as a protocol control message is received (step 1003). More particularly, the MAC header of the received message is examined to check whether or not the received message has an L2 multicast protocol message. Namely, in the case where the received message includes an L2 multicast protocol (for example, GMRP), an MAC header 120a of a GMRP message format 120 shown in FIG. 8 is examined to check whether or not the received message is an L2 multicast protocol message.

In the case where the judgement of the L2 multicast protocol message as being received is made, a processing for L2 multicast protocol is performed (step 1005), as will be described later on in reference to FIG. 11.

In the case where the judgement of the L2 multicast protocol message as being not received is made in step 1003, the received multicast message is judged as being not the protocol control message but a usual multicast data packet and hence a processing for forwarding to a receiver (or destination for transmission) of that multicast data packet is performed (step 1004), as will be described later on in reference to FIG. 3.

The forwarding processing performed by the forwarding processing unit 25 will now be described. An example of the forwarding processing will be described using a flow chart shown in FIG. 3. First, an L2 multicast address is read from an MAC header of the received L2 multicast message (or usual L2 multicast data packet) having a format similar to that of the MAC header 120a of FIG. 8 to search an L2 multicast table 26 of FIG. 5 or the like (step 1101) to check whether or not the read L2 multicast address exists in the L2 multicast address columns 26a of the table 26 or the like, that is, whether or not the table search results in a hit (step 1102). In the case where the read L2 multicast address exists in the table 26 or the like, that is, in the case where there results in table hit, receiver ports corresponding to the read L2 multicast address are read from the receiver port column 26a so that the received multicast data packet is relayed (or transmitted) through the transmit/receive processing unit 21 to the read receiver ports (or transmit destination ports) excepting the receiving port (step 1103). Numerals 1, 3, 5 and so forth in the receiver port column 26b shown in FIG. 5 correspond to the receiver ports 20a, 20b and so forth shown in FIG. 1.

On the other hand, in the case where the read L2 multicast address does not exist in the table 26 or the like, that is, in the case where there results in table mishit, the received multicast data packet is relayed (or transmitted) to all the ports of the inter-LAN relay device 20 through the transmit/receive processing unit 21 or the multicast data packet is revoked (step 1104).

Figure 10:
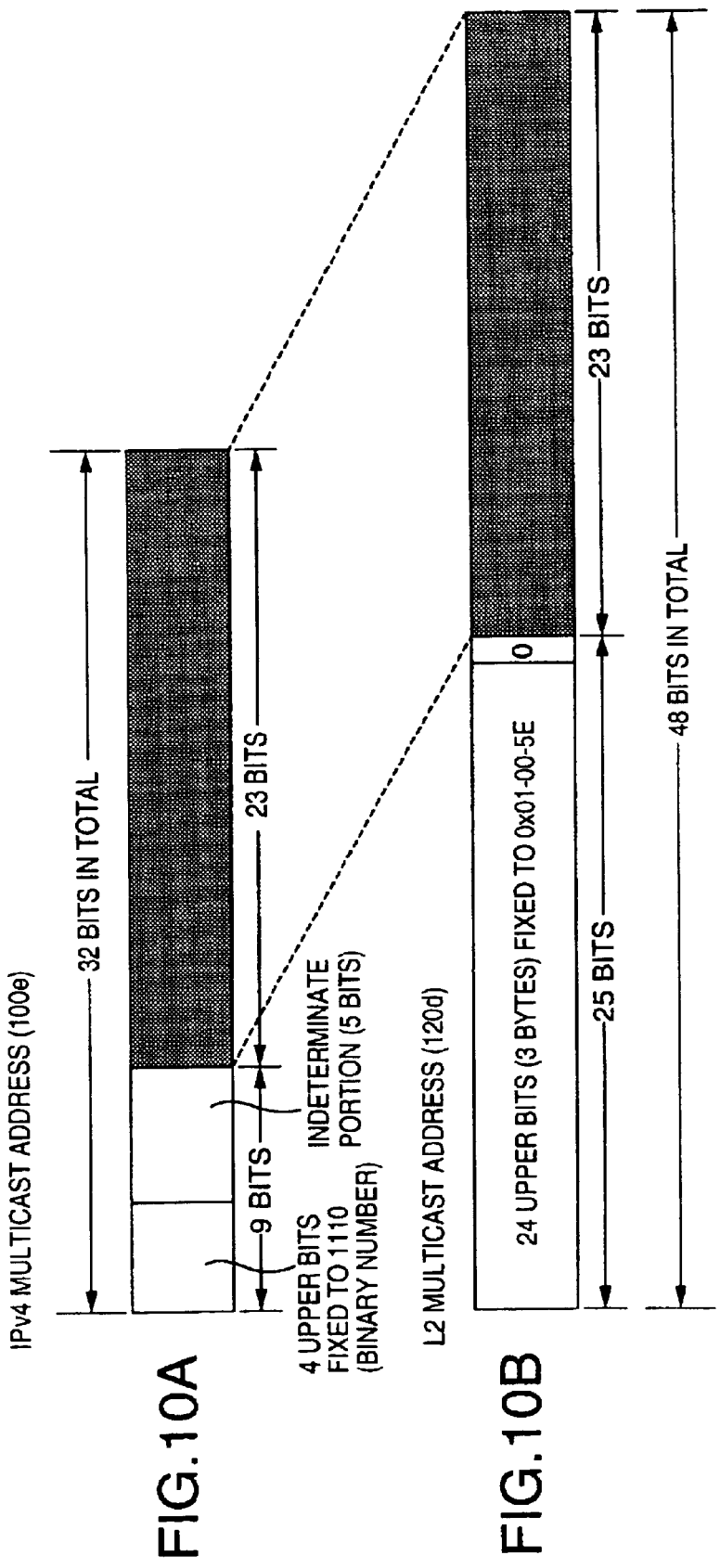
FIGS. 10A and 10B show an example of a method for conversion between IPv4 multicast address and L2 multicast address in the information relay device of the present invention.

Next, an example of the conversion processing performed by the conversion processing unit 22 will be described using a flow chart shown in FIG. 4. First or step 1301, an L3 multicast address in the received multicast message (for example, an IP multicast address 10e in an IGMP message format 100 shown in FIG. 6 or an IPv4 multicast address 10e in an IPv4 message format shown in FIG. 10A) is converted into an L2 multicast address (for example, an L2 multicast address 120d in an GMRP message format 120 shown in FIG. 8 or an L2 multicast address 120d in the GMRP message format 120 shown in FIG. 10B). For example, 9 upper bits (4 fixed bits and 5 indeterminate bits) of the IPv4 multicast address 100e shown in FIG. 10A is converted into 25 upper bits (a total of 25 bits including 24 fixed bits of data "01-00-5E" indicative of the multicast message plus 1 bit of "0") of the L2 multicast address 120d shown in FIG. 10B.

Next, whether or not the received message is a multicast transmit request is judged from a type value of a message format, for example, a type 100d of an IGMP message format 100 shown in FIG. 6 (step 1302). As shown in FIG. 7, in the case where the type value of the IGMP message 100c is 0x12, 0x16 or 0x22, the type of the message is "VersionX Membership Report" or a transmit request and the updating of the L2 multicast table 26 (see FIG. 5) for entry addition is indicated. On the other hand, in the case where the type value of the IGMP message 100c is 0x17, the type of the message is "VersionX Leave Group" or a transmit refusal request (or is not a transmit request) and the updating of the L2 multicast table 26 (see FIG. 5) for entry deletion is indicated. Also, as shown in FIG. 9, the type of the GMPR message corresponding to the type "VersionX Membership Report" of the GMPR message 100c is "JoinEmpty" or "JoinIn" and the type of the GMPR message corresponding to the type "VersionX Leave Group" of the GMPR message 100c is "LeaveAll" or "LeaveIn".

Accordingly, in the case where the received message is the multicast transmit request (for example, in the case where the type value of the IGMP message 100c is any one of 0x12, 0x16 and 0x22), the type value of the IGMP message 100c is rewritten into "JoinEmpty" or "JoinIn". Thus, the transmit request message 100 of L3 multicast protocol (for example, the type 100d and the IP multicast address 100e of the IGMP message 100c) is rewritten to generate a transmit request message of L2 multicast protocol and to transmit the generated message (step 1304).

Further, the updating of the L2 multicast table 26 (FIG. 5) for entry addition of the thus generated transmit request message of L2 multicast protocol is performed (step 1305). Namely, the L2 multicast address 120d (FIGS. 8 and 10B) of the generated L2 multicast protocol message is added into the L2 multicast table 26. At this time, the L2 multicast address is written into an entry for the same receiver port (26b) as a receiver port indicated by the L2 multicast address.

On the other hand, in the case where the received message is not the multicast transmit request, the judgement is made of whether or not the received message is a multicast transmit refusal request (step 1303). For example, in the case where the type value of the IGMP message 100c is 0x17, the message type is "VersionX Leave Group" or the received message is not a multicast transmit request but a multicast transmit refusal request. In the case of the multicast transmit refusal request, the type value of the IGMP message 100c is rewritten into "LeaveAll", "LeaveEmpty" or "LeaveIn". Thus, the transmit refusal request message 100 of L3 multicast protocol (for example, the type 100d and the IP multicast address 100e of the IGMP message 100c) is rewritten to generate a transmit refusal request message of L2 multicast protocol and to transmit the generated message (step 1306).

Further, the updating of the L2 multicast table 26 (FIG. 5) for entry deletion of the thus generated transmit refusal request message of L2 multicast protocol is performed (step 1307). Namely, an entry of the L2 multicast table 26 corresponding to the L2 multicast address 120d (FIGS. 8 and 10B) of the generated L2 multicast protocol message is deleted.

In the following, specific examples of conversion between L2 and L3 multicast protocols will be described.

Figure 21:
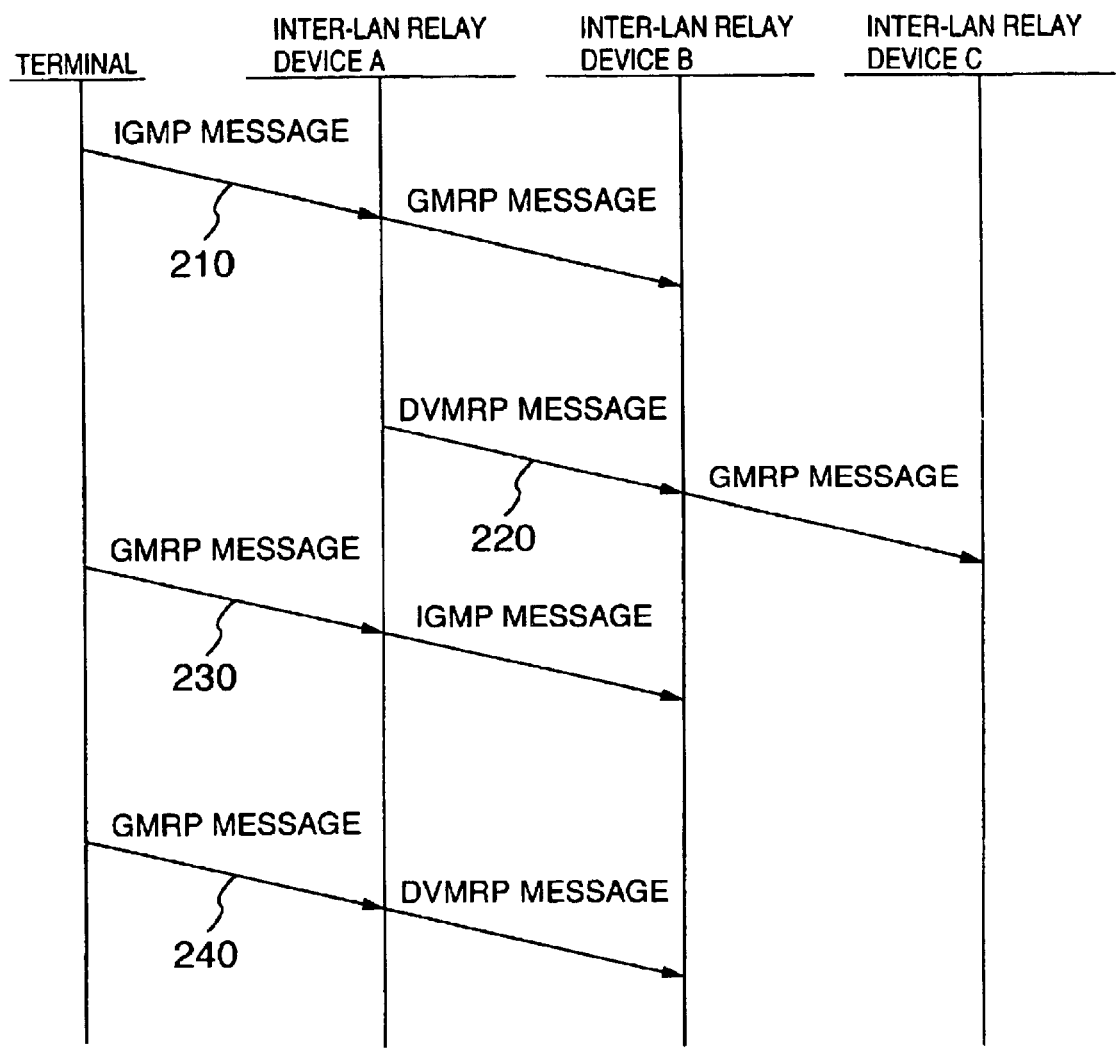
FIG. 21 is a diagram showing an example of the flow of information with a conversion between multicast protocols in the information relay device of the present invention.

(1) Conversion From L3 Multicast (Join/Leave Protocol) Message Into L2 Multicast Message In the case where the L3 multicast protocol is IGMP and the L2 multicast protocol is GMRP, the flow of information takes the course of terminal (transmission of IGMP message)→inter-LAN relay device A (conversion into GMRP message and transmission thereof)→inter-LAN relay device B, as shown by arrow 210 in FIG. 21.

As exemplified in FIG. 6, an IGMP message format 100 is composed of an MAC header 100a, an IP header 100b and an IGMP message 100c including type 100d, IP multicast address 100e and other 100f. The type (or meaning) of a message indicated by a value set in the type 100d has a relationship as shown by a table 110 in FIG. 7.

On the other hand, a GMRP message format 120 is composed of an MAC header 120a and a GMRP message 120b including type 120c, L2 multicast address 120d and other 120e, as shown in FIG. 8. The type (or meaning) of a message indicated by the type 120c has a relationship as shown by a table 130 in FIG. 9.

Accordingly, the following is made in the conversion from the IGMP message into the GMRP message the case of a join message, example, "Membership Report" (0x12/0x16) of the type 100d of IGMP is replaced "JoinIn" (0x2) of the type 120c of GMRP. In the case of a leave message, "Leave Group" (0x17) of the type 100d of IGMP is replaced by "LeaveIn" (0x4) of the type 120c of GMRP.

Further, the following address conversion is made, as shown in FIGS. 10A and 10B. Namely, in the case 9' of IPv4, 23 lower bits of the IPv4 multicast address of 32 bits in total (FIG. 10A) are remained as they are while 9 upper bits thereof are replaced by 25 upper bits (including 24 bits on the leading side plus 1 bit of "0") of the L2 multicast address of 48 bits in total (FIG. 10B).

Figure 11:
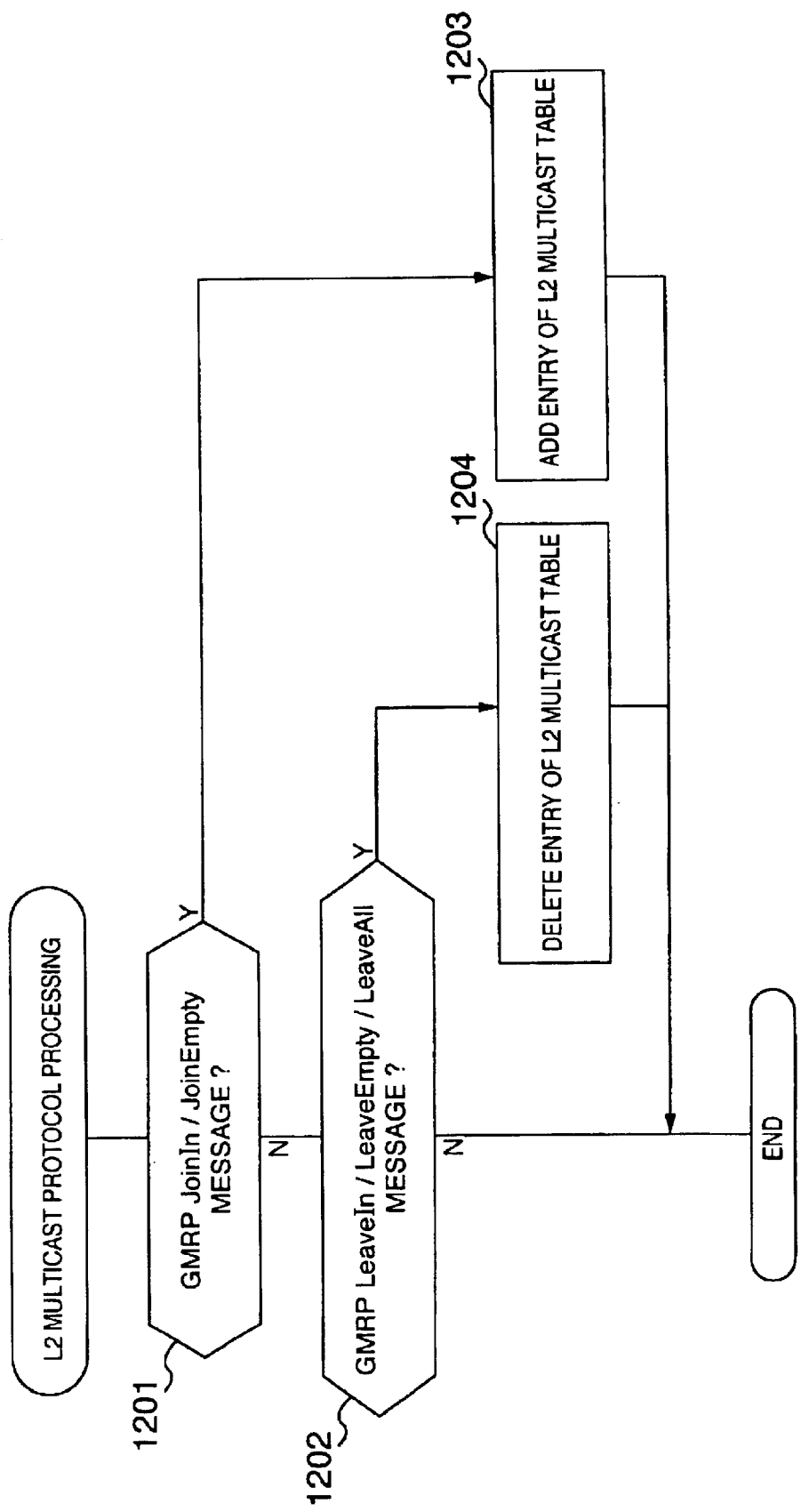
FIG. 11 is a flow chart showing an example of an L2 multicast protocol processing in the information relay device of the present invention in the case where an L2 multicast protocol is GMRP.

FIG. 11 shows a specific example of the flow of the L2 multicast protocol processing in step 1005 of FIG. 2 in the case where the L2 multicast protocol is GMRP.

Namely, in the case where the received L2 multicast protocol message is "JoinIn" or "JoinEmpty" of GMRP (step 1201), the updating of the L2 multicast table 26 for entry addition is performed (step 1203).

Also, in the case where the received L2 multicast protocol message is "LeaveIn", "LeaveEmpty" or "LeaveAll" of GMRP (step 1202), the updating of the L2 multicast table 26 for entry deletion is performed (step 1204).

Figure 12:
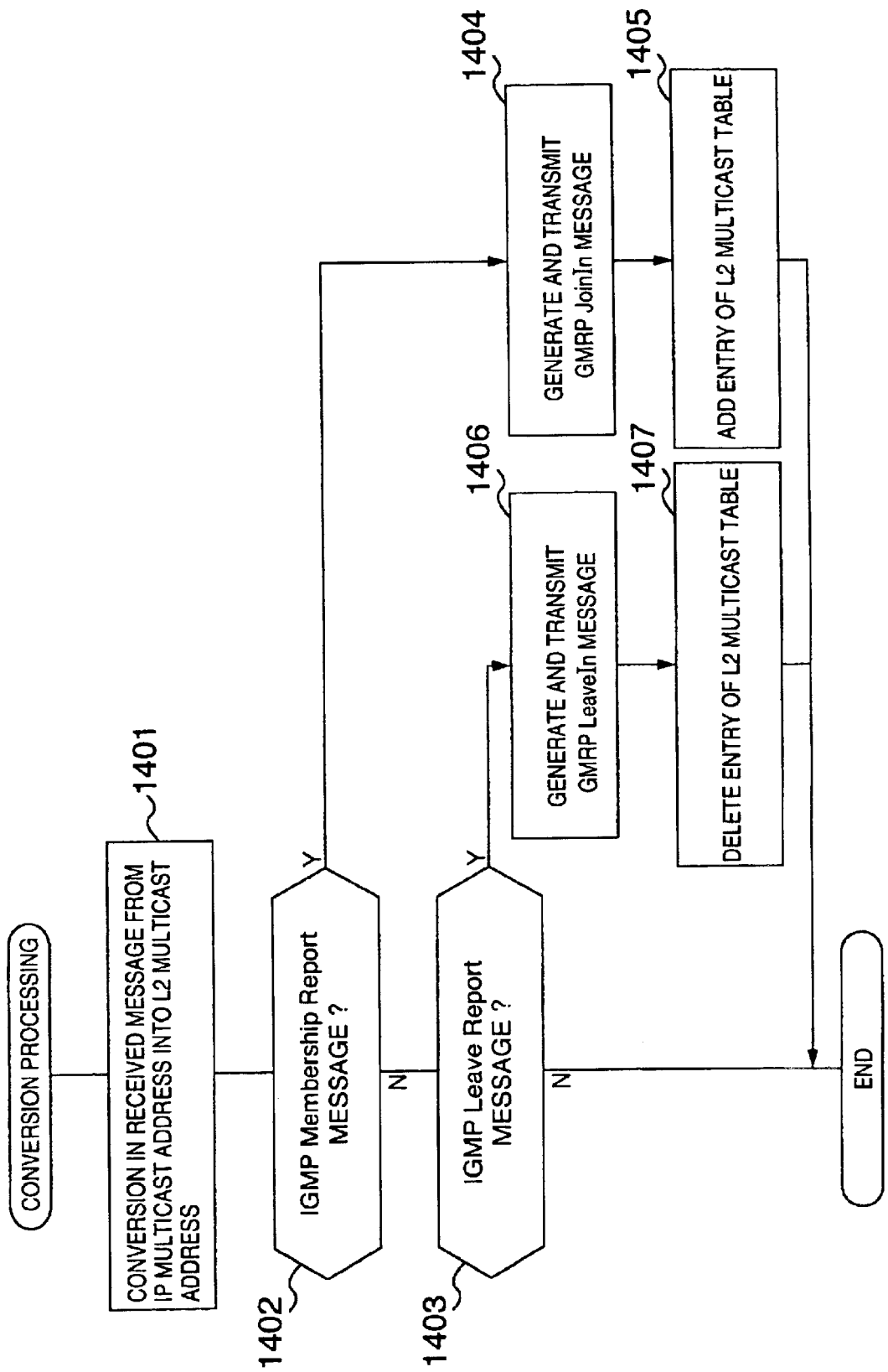
FIG. 12 is a flow chart showing an example of a processing for conversion into L2 multicast protocol in the information relay device of the present invention in the case where an L3 multicast protocol is IGMP.

FIG. 12 shows a specific example of the flow of the conversion processing in step 1006 of FIG. 2 in the case where the L2 multicast protocol is GMRP.

Namely, the conversion in the received message from the IP multicast address into the L2 multicast address is made in a method exemplified in FIGS. 10A and 10B (step 1401). In the case of a "Membership Report" message of IGMP (step 1402), a "JoinIn" message of GMRP is generated and transmitted (step 1404). Further, the updating of the L2 multicast table 26 for entry addition is performed (step 1405).

In the case of a "Leave Group" message of IGMP (step 1403), a "LeaveIn" message of GMRP is generated and transmitted (step 1406). Further, the updating of the L2 multicast table 26 for entry deletion is performed (step 1407).

In the case where the L3 multicast protocol is MLD and the L2 multicast protocol is GMRP, the flow of information takes the course of terminal (transmission of MLD message)→inter-LAN relay device A (conversion into GMRP message and transmission thereof)→inter-LAN relay device B.

As exemplified in FIG. 26, this MLD message format 200 is composed of an MAC header 200a, an IPv6 header 200b and an IGMP message 200c including type 200d, IPv6 multicast address 200e and other 200f.

A value of 131 set in the type 200d represents a "Multicast Listener Report" message indicating a request for joining to a multicast service. A set value of 132 represents a "Multicast Listener Done" message indicating a request for leaving from the multicast service.

Figure 16A:
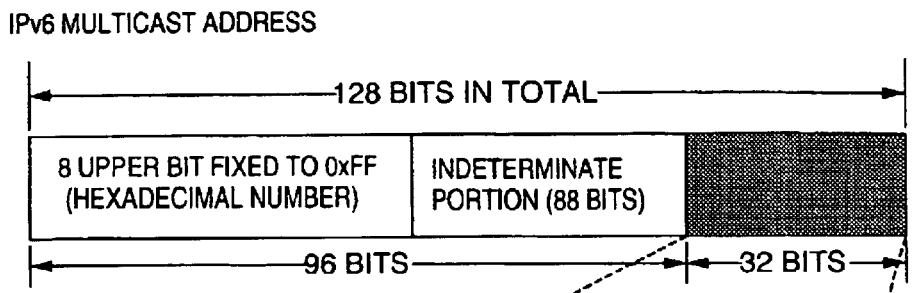
FIGS. 16A and 16B show an example of a method for conversion between IPv6 multicast address and L2 multicast address in the information relay device of the present invention.
Figure 16B:
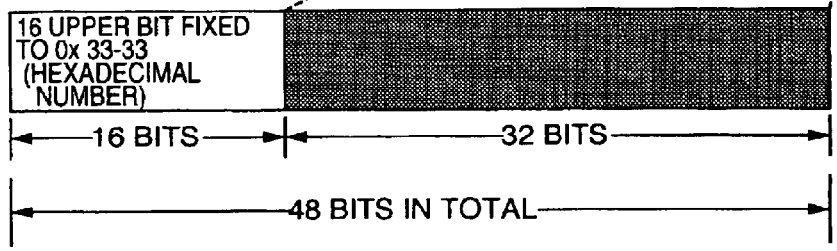

Accordingly, in the case where the conversion from the L3 multicast protocol into the L2 multicast protocol corresponding to FIG. 12 is made, the address conversion as exemplified in FIGS. 16A and 16B is performed by copying a portion of 32 lower bits of the IPV6 multicast address (FIG. 16A) into 32 lower bits of the L2 multicast address (FIG. 16B). Further, the "Multicast Listener Report" message is converted into "JoinIn" or "JoinEmpty" of GMRP of L2. The "Multicast Listener Done" message is converted into "LeaveIn", "LeaveEmpty" or "LeaveAll" of GMRP.

The correspondence relationship in conversion between the L2 multicast protocol and the L3 multicast (join/leave protocol) message as mentioned above is shown on the upper stage side of a table 150 of FIG. 20 in conjunction with the case where L2 is GMRP and L3 is IGMP and MLD.

(2) Conversion From L3 Multicast (Routing Control Protocol) Message Into L2 Multicast Message In the case where the L2 multicast protocol is GMRP and the L3 multicast protocol is DVMRP, the flow of information takes the course of inter-LAN relay device A (transmission of DVMRP message) 4 inter-LAN relay device B (conversion into GMRP message and transmission thereof)→inter-LAN relay device C, as shown by arrow 220 in FIG. 21.

Figure 22:
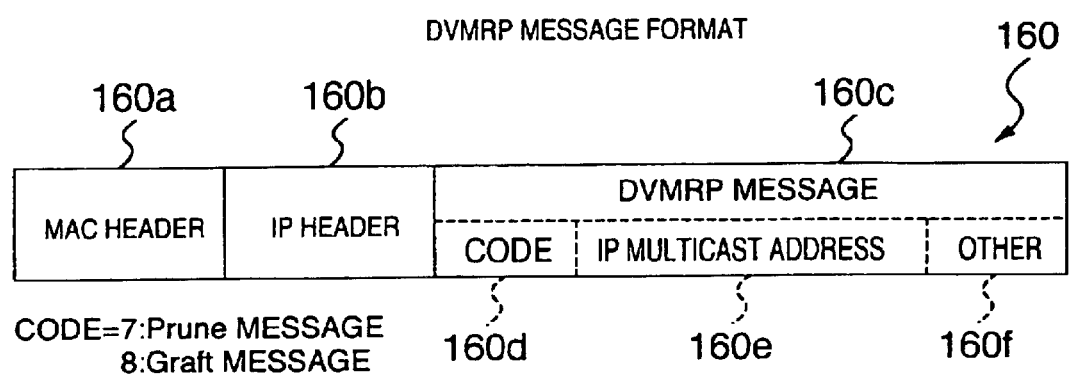
FIG. 22 shows an example of a message format of DVMRP which is an example of an L3 multicast protocol.

For DVMRP in this case, a DVMRP message format 160 is composed of an MAC header 160a, an IP header 160b and a DVMRP message 160c including code 160d, IP multicast address 160e and other 160f, as shown in FIG. 22. The meaning of a value set in the code 160d is such that code=7 indicates a Prune message and code=8 indicates a Graft message.

"Graft" and "Prune" of DVMRP are respectively converted into "Join" system and "Leave" system messages of GMRP, as shown on the lower stage side of the table 150 in FIG. 20.

In the case where the L2 multicast protocol is GMRP and the L3 multicast protocol is PIM-DM, the flow of information takes the course of inter-LAN relay device A (transmission of PIM-DM message) 4 inter-LAN relay device B (conversion into GMRP message and transmission thereof) →inter-LAN relay device C.

Figure 23:
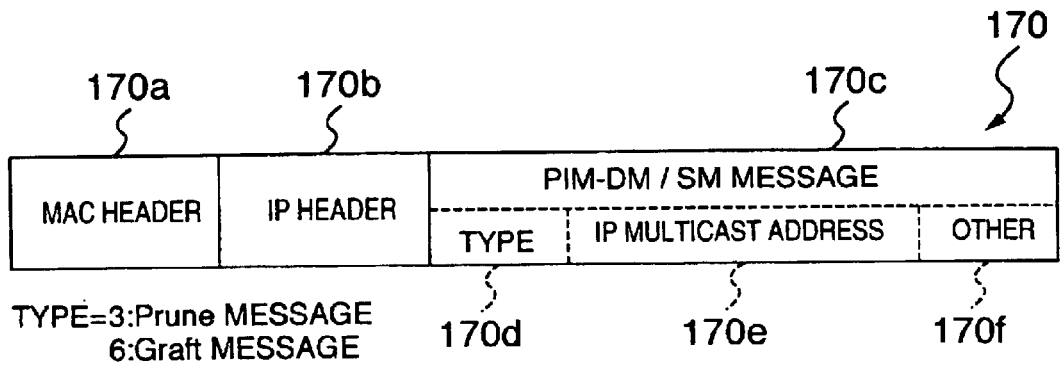
FIG. 23 shows an example of a message format of PIM-DM/PIM-SM which is an example of the L3 multicast protocol.

For PIM-SM/DM in this case, a PIM-SM/DM message format 170 is composed of an MAC header 170a, an IP header 170b and a PIM-SM/DM message 170c including type 170d, IP multicast address 170e and other 170f, as shown in FIG. 23. The meaning of a value set in the type 170d is such that type=3 indicates a Join/Prune message and type=6 indicates a Graft message.

"Graft" and "Join"/"Prune" of PIM-DM are respectively converted into "Join" system and "Leave" system messages of GMRP, as shown on the lower stage side of the table 150 in FIG. 20.

In the case where the L2 multicast protocol is GMRP and the L3 multicast protocol is PIM-SM, the flow of information takes the course of inter-LAN relay device A (transmission of PIM-SM message)→inter-LAN relay device B (conversion into GMRP message and transmission thereof) →inter-LAN relay device C.

A message format in this case has already been described in conjunction with FIG. 23. "Join""Prune" of PIM-SM is converted into "Join" system and "Leave" system messages of GMRP, as shown on the lower stage side of the table 150 in FIG. 20.

In the case where the L2 multicast protocol is GMRP and the L3 multicast protocol is CBT, the flow of information takes the course of inter-LAN relay device A (transmission of CBT message) →inter-LAN relay device B (conversion into GMRP message and transmission thereof)→inter-LAN relay device C.

Figure 24:
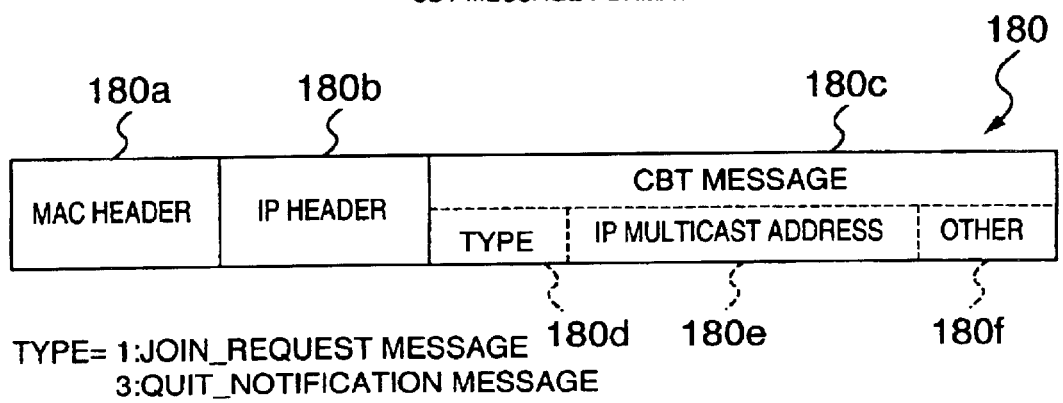
FIG. 24 shows an example of a message format of CBT which is an example of the L3 multicast protocol.

For CBT in this case, a CBT message format 180 is composed of an MAC header 180a, an IP header 180b and a CBT message 180c including type 180d, IP multicast address 180e and other 180f, as shown in FIG. 24. The meaning of a value set in the type 180d is such that type=1 indicates a JOIN_REQUEST message and type=3 indicates a QUIT_NOTIFICATION message.

"JOIN_REQUEST" and "QUIT_NOTIFICATION" of CBT re respectively converted into "Join" system and "Leave" system messages of GMRP, as shown on the lower stage side of the table 150 in FIG. 20.

In the case where the L2 multicast protocol is GMRP and the L3 multicast protocol is MOSPF, the flow of information takes the course of inter-LAN relay device A (transmission of MOSPF message)→inter-LAN relay device B (conversion into GMRP message and transmission thereof) inter-LAN relay device C.

Figure 25:
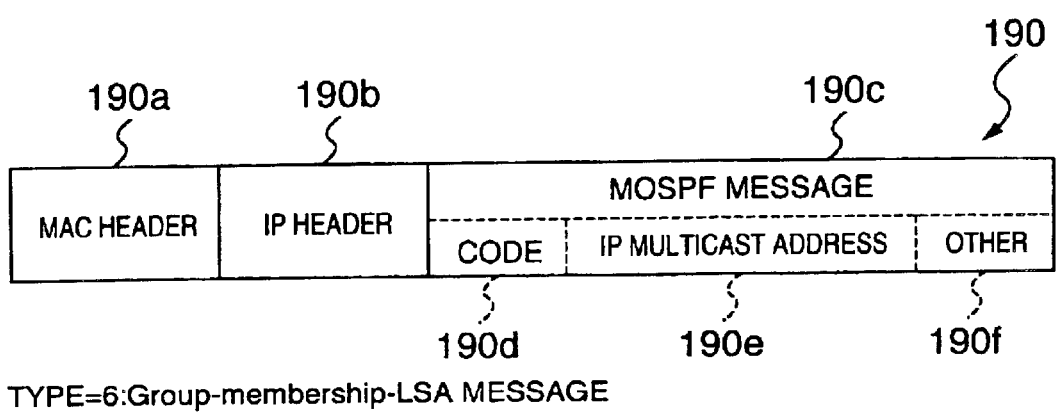
FIG. 25 shows an example of a message format of MOSPF which is an example of the L3 multicast protocol.

For MOSPF in this case, an MOSPF message format 190 is composed of an MAC header 190a, an IP header 190b and an MOSPF message 190c including type 190d, IP multicast address 190e and other 190f, as shown in FIG. 25. The meaning of a value set in the type 190d is such that type=6 indicates a Group-membership-LSA message.

"Group-membership-LSA" of MOSPFT is converted into a "Join" system message of GMRP, as shown on the lower stage side of the table 150 in FIG. 20.

(3) Conversion From L2 Multicast Message into L3 Multicast (Join/Leave Protocol) Message A general receive processing flow in the case of a processing for conversion from the L2 multicast protocol into the L3 multicast protocol is shown in FIG. 13 (which corresponds to FIG. 2). This processing is performed by a receive processing unit 24 shown in FIG. 17 which will be described later on.

First, the presence/absence of reception of an L2 multicast message is monitored (step 1501). In the case where the L2 multicast message is received, the judgement is made of whether or not the received message is an L2 multicast protocol message (step 1502). In the case where the received message is an L2 multicast protocol message, an L2 multicast protocol processing as exemplified by the flow chart of FIG. 11 having already been mentioned is performed (step 1504) and a processing for conversion into an L3 multicast protocol is performed (step 1505).

In the case where the judgement of the received message as being not an L2 multicast protocol message is made in step 1502, there is performed a forwarding processing similar to that in step 1004 of FIG. 2 in which the message is forwarded to the destination for relay as it is (step 1503).

In the conversion processing in step 1505, there is performed a processing exemplified by a flow chart in FIG. 14.

First, the multicast address conversion from L2 to L3 is made in a method exemplified in FIGS. 10A and 10B or FIGS. 16A and 16B (step 1601). Next, in the case where a received L2 message is a multicast transmit request (step 1602), a transmit request message of L3 multicast protocol having an equivalent meaning is generated and transmitted to the destination for relay (step 1604). In the case where the received L2 message is not a multicast transmit request, the examination is made of whether or not the message is a multicast transmit refusal request (step 1603). In the case where the message is a multicast transmit refusal request, a transmit refusal message of L3 multicast protocol having an equivalent meaning is generated and transmitted to the destination for relay (step 1605).

A more specific example of the conversion processing will be described by use of a flow chart in FIG. 15 in conjunction with the case where the L2 multicast protocol is GMRP and the L3 multicast protocol is IGMP.

The flow of information in this case takes the course of terminal (transmission of GMRP message)→inter-LAN relay device A (conversion into IGMP message and transmission thereof) →inter-LAN relay device B, as shown by arrow 230 in FIG. 21.

First, the multicast address conversion from L2 to L3 is made in a manner similar to that in FIGS. 10A and 10B (step 1701). Next, in the case where a received L2 multicast protocol message is "JoinIn" or "JoinEmpty" of GMRP (step 1702), a "Membership Report" message of IGMP for L3 equivalent thereto is generated and transmitted to the destination for relay (step 1704).

In the case where the received L2 multicast protocol message is "LeaveIn" or "LeaveEmpty" of GMRP (step 1703), a "Leave Group" message of IGMP for L3 equivalent thereto is generated and transmitted to the destination for relay (step 1705).

Also, in the case where the L2 multicast protocol is GMRP and the L3 multicast protocol is MLD. The flow of information in this case takes the course of terminal (transmission of GMRP message)→inter-LAN relay device A (conversion into MLD message and transmission thereof) →inter-LAN relay device B. In this case, in the above-mentioned conversion processing in step 1704, "Multicast Listener Report" of MLD is generated and transmitted. Also, in the processing in step 1705, "Multicast Listener Done" is generated and transmitted.

(4) Conversion From L2 Multicast Message Into L3 Multicast (Routing Control Protocol) Message In the case where the L2 multicast protocol is GMRP and the L3 multicast protocol is DVMRP, the flow of information takes the course of terminal (transmission of GMRP message)→inter-LAN relay device A (conversion into DVMRP message and transmission thereof) →inter-LAN relay device B, as shown by arrow 240 in FIG. 21. "Join" system and "Leave" system messages of GMRP are converted into "Graft" and "Prune" of DVMRP, respectively.

Similarly, in the case where the L2 multicast protocol is GMRP and the L3 multicast protocol is PIM-SM, the flow of information takes the course of terminal (transmission of GMRP message)→inter-LAN relay device A (conversion into PIM-SM message and transmission thereof) →inter-LAN relay device B. "Join" system and "Leave" system messages of GMRP are converted into "Join"/"Prune" of PIN-SM.

Similarly, in the case where the L2 multicast protocol is GMRP and the L3 multicast protocol is PIM-DM, the flow of information takes the course of terminal (transmission of GMRP message) 4 inter-LAN relay device A (conversion into PIM-DM message and transmission thereof) →inter-LAN relay device B. "Join" system and "Leave" system messages of GMRP are converted into "Graft" and "Join"/ "Prune" of PIM-DM, respectively.

Similarly, in the case where the L2 multicast protocol is GMRP and the L3 multicast protocol is CBT, the flow of information takes the course of terminal (transmission of GMRP message)→inter-LAN relay device A (conversion into CBT message and transmission thereof)→inter-LAN relay device B. "Join" system and "Leave" system messages of GMRP are converted into "JOIN REQUEST" and "QUIT NOTIFICATION" of CBT, respectively.

Similarly, in the case where the L2 multicast protocol is GMRP and the L3 multicast protocol is MOSPF, the flow of information takes the course of terminal (transmission of GMRP message) 4 inter-LAN relay device A (conversion into MOSPF message and transmission thereof) →inter-LAN relay device B. A "Join" system message of GMRP is converted into "Group-membership-LSA" of MOSPF.

Next, the reference to FIGS. 17, 18, 19 and so forth will be made to show an example in which multicast packets flowing on the information network system are monitored to collect and register prefix portions of multicast addresses so that the registered prefix address portion is utilized in a processing for conversion from an L2 multicast protocol into an L3 multicast protocol.

Figure 17:
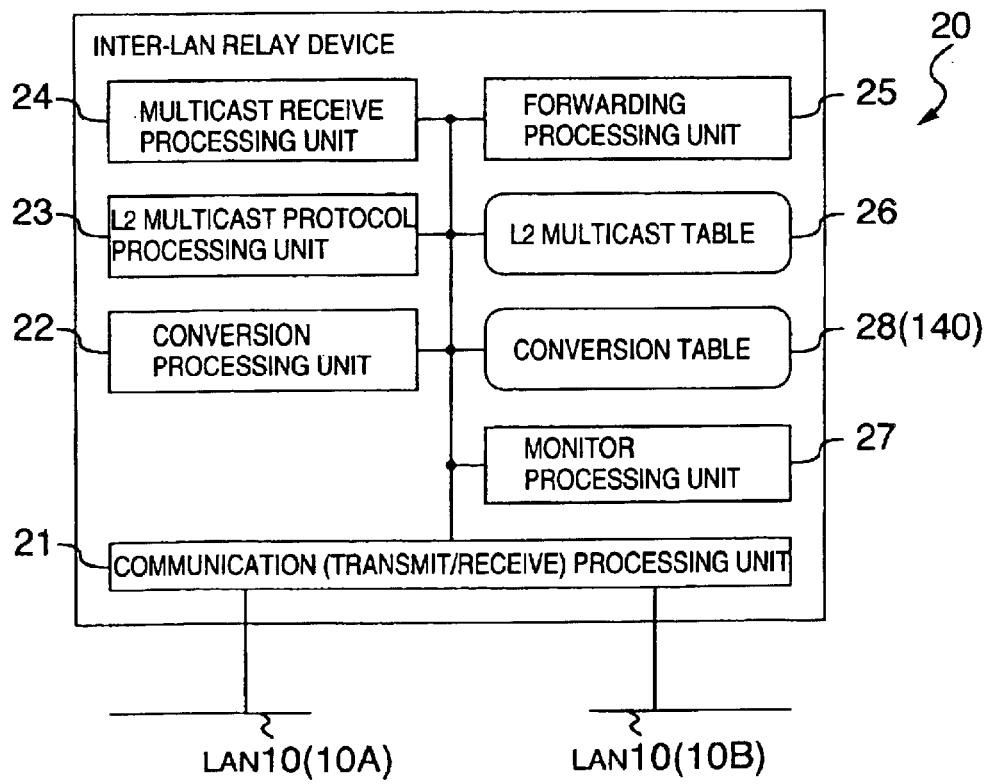
FIG. 17 is a block diagram showing the construction of a modified example of the information relay device of the present invention.
Figure 18:
FIG. 18 is a diagram showing an example of a conversion table, in the information relay device of the present invention, in which prefix addresses collected from multicast protocol packets are stored.

As exemplified in FIG. 17, each of the inter-LAN relay devices 20 (20A, 20B, 20C, - - - ) shown in FIG. 1 is additionally provided with a monitor processing unit 27 for monitoring an L3 multicast packet to be relayed, thereby extracting a prefix portion of its multicast address (for example, 9 leading bits of IPv4 in FIG. 10A or 96 leading bits of IPv6 in FIG. 16A), and a multicast address memory such as a conversion table 140 (28) for storing the extracted prefix address. The monitor processing unit 27 may be formed by an ASIC or program, and the table 140 may be formed by an ASIC or a part of ROM or RAM.

Figure 19:
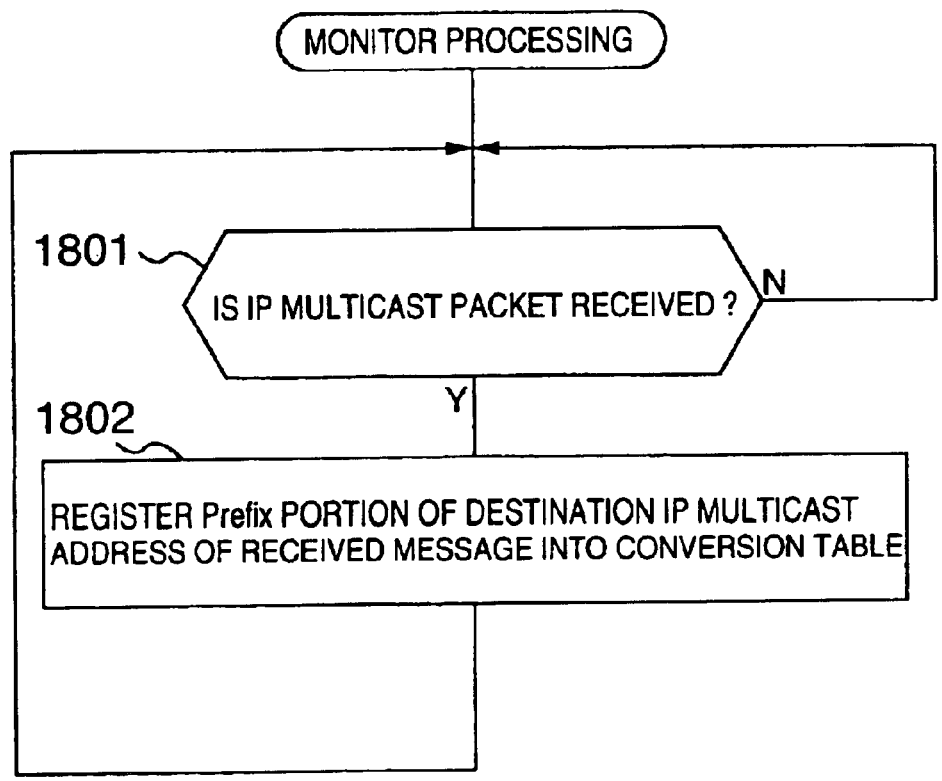
FIG. 19 is a flow chart showing an example of a processing for monitoring of a multicast packet in the modified example of the information relay device of the present invention.

As exemplified by a flow chart shown in FIG. 19, the monitor processing unit 27 monitors whether or not an IP multicast packet of L3 is received (step 1801). When it is received, the monitor processing unit 27 reads a prefix address portion of an IP multicast address and stores it into the conversion table 140 (see FIG. 18) for each type (step 1802).

In generating an IP multicast address 100e at the time of conversion from a GMRP message of L2 into an IGMP message of L3 (as shown in FIG. 6), for example, as in step 1601 of the flow chart of FIG. 14 (corresponding to that of FIG. 4) or step 1701 of the flow chart of FIG. 15 (corresponding to that of FIG. 12), the corresponding data registered in the conversion table 140 is used for generating 9 upper bits other than 23 lower bits (in the case of FIG. 10A) of the IP multicast address taken over from the GMRP message or 96 upper bits other than 32 lower bits (in the case of FIG. 16A) thereof.

Next, the reference to FIGS. 27 and 28 will be made to describe an actual operation in which after a processing for a request for joining to multicast service transmitted from a specified terminal 30 is performed in the above-mentioned processing for conversion between L2 and L3 multicast protocols, a multicast packet transmitted from a multicast server 40 is selectively relayed to the terminal 30.

An L3 multicast memory such as an L3 multicast table 250 exemplified in FIG. 27 is stored with an IP multicast address 250a as a destination address and a corresponding receiver IP subnet 250b having the list of one or plural subnet masks for specifying one or plural subnets to which a multicast packet with that multicast address is to be relayed.

Though not shown in FIG. 1 or 17, the L3 multicast table 250 is mounted on the inter-LAN relay device 20 (20C) which functions as a router for performing an L3 relaying operation for the widely used L3 multicast protocol such as IGMP. The table 250 may be formed by an ASIC, ROM or RAM.

First, when an IP multicast packet is received (step 1901), the L3 multicast table 250 is searched using the received multicast address (step 1902). In the case where there results in a hit, 23 lower bits of a value registered in the L2 multicast address column 26a of the L2 multicast table 26 (see FIG. 5) are searched by use of 23 lower bits of the IP multicast address (step 1903). In the case where there results in a hit, the IP multicast packet is selectively relayed to a terminal 30 connected to a receiver port stored in the receiver port column 26b of the table 26 (step 1904).

In the case where the search in step 1902 or 1903 results in a mishit, the IP multicast packet is revoked (step 1905).

In connection to the above-mentioned conversion between the multicast protocols of L2 and L3 levels in the present invention, FIGS. 29A and 29B and FIGS. 30A and 30B show a processing for conversion and transmission of a multicast service join message (or pre-procedure) and the behavior of traffic reduction in an actual multicast packet transmission control processing performed after this pre-procedure.

Figure 29B:
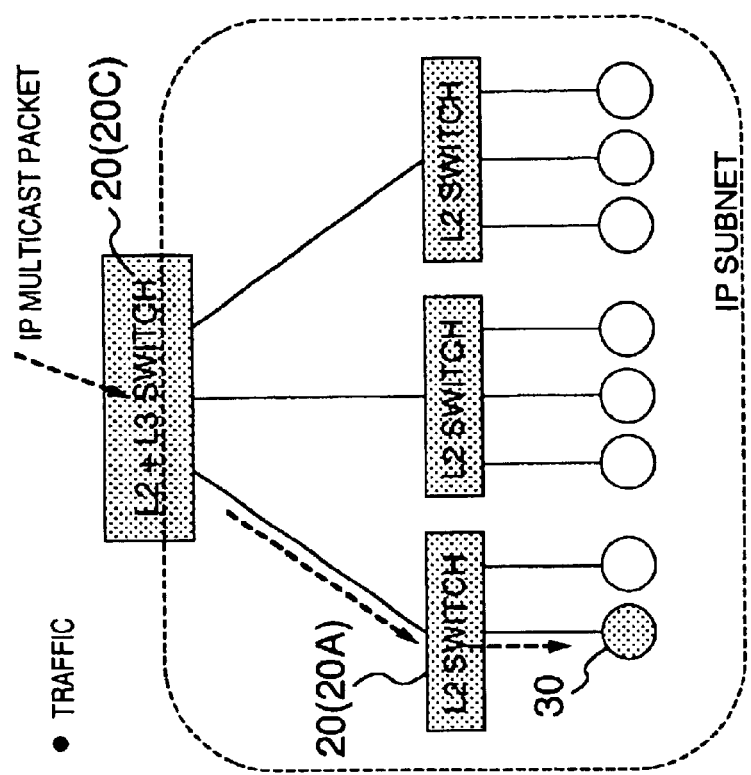
FIGS. 29A and 29B are diagrams showing an example of the operation and effect in the case where each of all information relay devices installed in information networks is provided with a function of conversion between L2 and L3 multicast protocols according to the present invention.
Figure 29A:
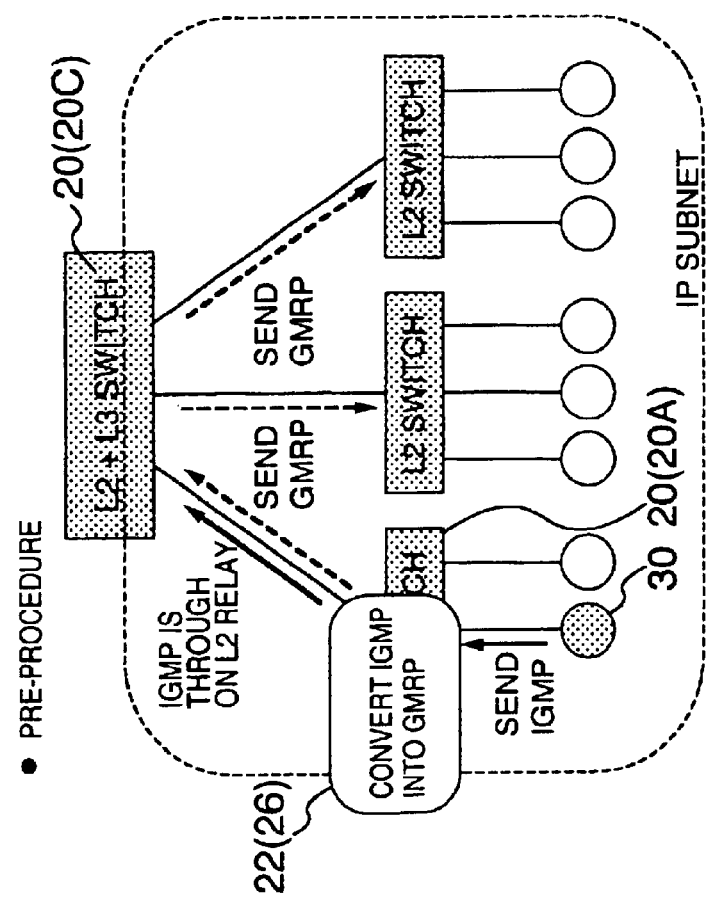

FIGS. 29A and 29B correspond to the case where each of all inter-LAN relay devices 20 (switches) is provided with a function of multicast protocol conversion between L2 and L3 in the present invention.

The pre-procedure in this case is performed as shown in FIG. 29A. Namely, in an inter-LAN relay device 20 (20A)

connected to a terminal 30 and functioning as an L2 level switch, IGMP of L3 level transmitted from the terminal 30 is converted into GMRP of L2 level. The GMRP of L2 level is transmitted from the inter-LAN relay device 20 (20A) to the other inter-LAN relay devices 20 (20B, 20C, - - - ). The original IGMP of L3 level is also transmitted to the other inter-LAN relay devices 20 (20B, 20C, - - - ) after passed through the inter-LAN relay device 20 (20A) as it is.

After the execution of the above pre-procedure, an IP multicast packet arriving the inter-LAN relay device 20 (20C) on the backbone side from a multicast server 40 is selectively transmitted to only the terminal 30 in the IP subnet, as shown in FIG. 29B, as if the terminal 30 supported the multicast protocol of L2 level even in the case where the terminal 30 is not provided with a function of processing GMRP of L2 level.

Figure 30A:
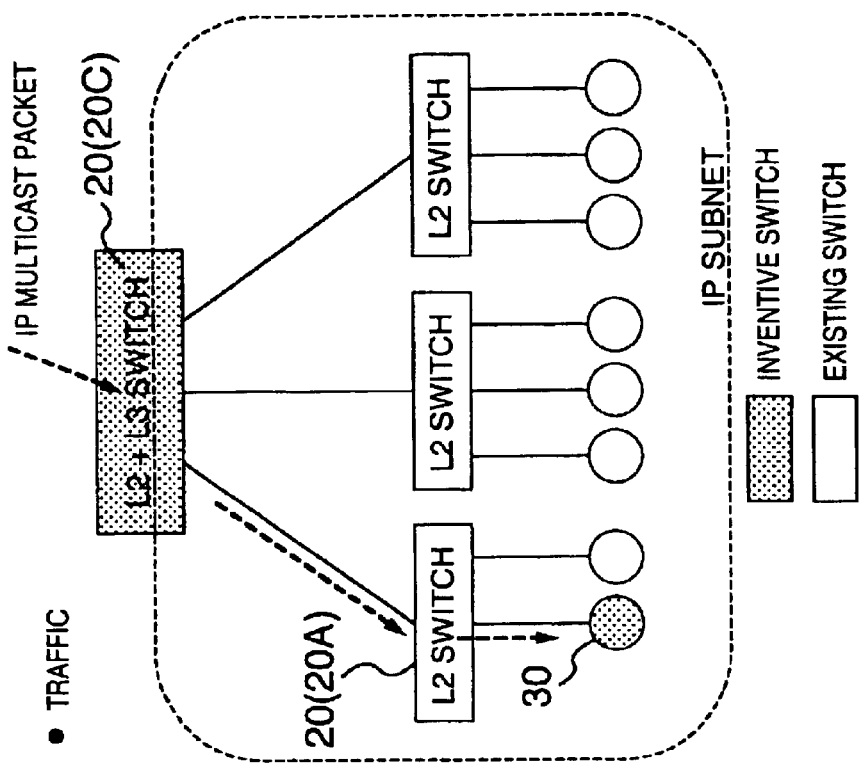
FIGS. 30A and 30B are diagrams showing an example of the operation and effect in the case where only an information relay device on the backbone side in information networks is provided with the function of conversion between L2 and L3 multicast protocols according to the present invention.
Figure 30B:
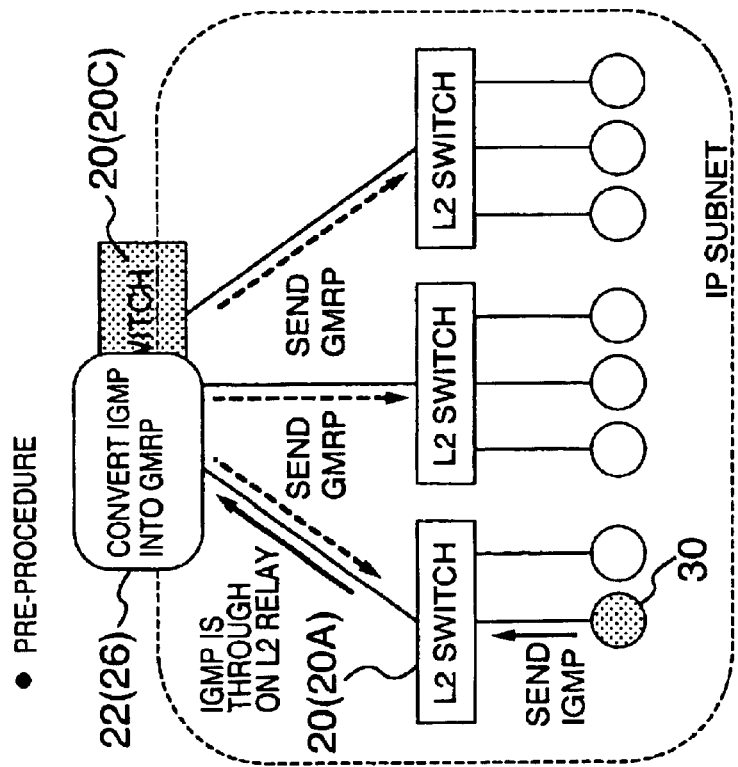

FIGS. 30A and 30B correspond to the case where only an inter-LAN relay device 20 (20C) on the backbone side is provided with a function of multicast protocol conversion between L2 and L3 in the present invention.

In this case, as shown in FIG. 30A, IGMP of L3 level transmitted from a terminal 30 is passed through an inter-LAN relay device 20 (20A) connected to the terminal 30 and functioning as an L2 level switch and is thereafter transmitted to the inter-LAN relay device 20 (20C) on the backbone side. In the inter-LAN relay device 20 (20C), the IGMP of L3 level transmitted from the terminal 30 is converted into GMRP of L2 level. The GMRP of L2 level is transmitted to all the inter-LAN relay devices 20 (20A, 20B, 20C, - - - ).

After the execution of the above pre-procedure, an IP multicast packet arriving the inter-LAN relay device 20 (20C) on the backbone side from a multicast server 40 is selectively transmitted to only the terminal 30 in the IP subnet, as shown in FIG. 30B, as if the terminal 30 supported the multicast protocol of L2 level even in the case where the terminal 30 is not provided with a function of processing GMRP of L2 level.

Thus, according to the information relay device in the present embodiment, with a construction in which a multicast protocol of L3 level such as IGM which has come into wide use in association with a general purpose OS for a personal computer or the like is converted into a multicast protocol of L2 level such as GMRP which has not yet come into so wide use but is capable of a service for selective delivery of a multicast protocol, it is possible to realize a multicast service with a reduced traffic resulting from the selective delivery of a multicast packet in a subnet by the multicast protocol of L2 level. Namely, it becomes possible to realize a multicast service without increasing the traffic in a subnet beyond the requisite amount thereof.

Also, with a construction in which a multicast protocol of L2 level such as GMRP or the like the degree of utilization of which is low as yet is mounted on only inter-LAN relay devices 20 such as bridges or routers the number of which is relatively small, even if such a multicast protocol of L2 is not mounted on a large number of terminals 30 such as hosts connected to information networks, it is possible to realize the selective delivery of a multicast packet in a subnet by the multicast protocol of L2 level. Namely, it is possible to realize the simplification of mounting of multicast software in a host connected to a network and utilizing a multicast service.

In other words, there are compatibly enabled the suppression of an increase in traffic in a network which is caused from a multicast service and the easy/convenient realization and utilization of the multicast service which results from the simplification of mounting of multicast software on a terminal such as a host connected to the network.

Further, with a construction in which software for performing the conversion between multicast protocols of L2 and L3 levels is merely mounted on inter-LAN relay devices 20 the number of which is small as compared with that of terminals, the utilization of a variety of multicast protocols in a network becomes possible. Namely, there are compatibly enabled the simplification of mounting of multicast software in a host connected to a network and the utilization of a variety of multicast protocols.

In the foregoing, the present invention has been disclosed on the basis of the embodiments thereof. However, it is needless to say that the present invention is not limited to the disclosed embodiments and various changes or modifications are possible in a rage which does not depart from the gist of the present invention.

For example, the multicast protocols of L2 and L3 levels made the object of conversion processing in the present invention are not limited to those exemplified in the foregoing embodiments. There can also be applied to other protocols so long as the conversion is made so that essential information in a protocol message concerning a multicast service is logically reserved in conversion between L2 and L3 levels.

In the case where each inter-LAN relay device 20 in the foregoing embodiments is formed by software, as shown in FIG. 1B, processing programs and data shown in FIGS. 2 to 12 and so forth may be installed later on instead of being installed in the ROM (and RAM) of the inter-LAN relay device beforehand. Namely, such processing programs and data may be recorded in a recording medium such as a CD-ROM. The programs and data recorded in the recording medium can be written into the ROM (and RAM) of the inter-LAN relay device 20 by setting the recording medium on a recording medium reading unit 151 connected to the inter-LAN relay device 20 and connecting the recording medium reading unit 151 to the I/O circuit of the inter-LAN relay device 20. Alternatively, such processing programs and data may be loaded down onto the ROM (and RAM) of the inter-LAN relay device 20 through the network so that they are written thereinto.

What is claimed is:

1. An information relay device connected between a plurality of logical or physical networks for performing an operation for relay of information between said networks, comprising:

a transmit/receive processing unit for receiving a general purpose multicast message from one of said plurality of networks and transmitting a multicast message to at least one of said plurality of networks; and a protocol conversion processing unit for converting, in the case where the general purpose multicast message received by said transmit/receive processing unit is a multicast protocol message of a certain level, said multicast protocol message of the certain level into a multicast protocol message of another level, wherein in the case where the general purpose multicast message received by said transmit/receive processing unit is said multicast protocol message of the certain level, said protocol conversion processing unit rewrites a multicast address of said certain level in the received multicast message into a multicast address of said other level and rewrites a message of said certain level indicating a transmit request or a transmit refusal request in the received multicast message into a message of said other level having a meaning equivalent to a meaning of the message of said certain level.

2. An information relay device according to claim 1, further comprising a multicast information memory for storing a relationship between said multicast address of said other level and a receiver corresponding thereto, wherein in the case where the multicast message received by said transmit/receive processing unit indicates a transmit request and the updating for entry addition, said protocol conversion processing unit adds the rewritten multicast address of said other level in the received multicast message and a corresponding receiver into said multicast information memory, and in the case where the multicast message received by said transmit/receive processing unit indicates a transmit refusal request and the updating for entry deletion, said protocol conversion processing means deletes the rewritten multicast address of said other level layer in the received multicast message and a corresponding receiver from said multicast information memory.

3. An information relay device according to claim 1, wherein in the case where the general purpose multicast message received by said transmit/receive processing unit is a multicast protocol message of the third layer in an OSI reference model, said protocol conversion processing unit converts said multicast protocol message of the third layer into a multicast protocol message of the second layer and said transmit/receive processing unit transmits said multicast protocol message of the second layer to at least one of said plurality of networks.

4. An information relay device connected between a plurality of logical or physical networks for performing an operation for relay of information between said networks, comprising:

a transmit/receive processing unit for receiving a general purpose multicast message from one of said plurality of networks and transmitting a multicast message to at least one of said plurality of networks; and a protocol conversion processing unit for converting, in the case where the general purpose multicast message received by said transmit/receive processing unit is a multicast protocol message of a certain level, said multicast protocol message of the certain level into a multicast protocol message of another level, wherein a multicast address memory for storing a multicast address of said other level, wherein in the case where the general purpose multicast message received by said transmit/receive processing unit is said multicast protocol message of the certain level, said protocol conversion processing means rewrites a multicast address of said certain level in the received multicast message into a multicast address of said other level by use of the corresponding multicast address in said multicast address memory.

5. An information relay device connected between a plurality of logical or physical networks for performing an operation for relay of information between said networks, further comprising:

a transmit/receive processing unit for receiving a general purpose multicast message from one of said plurality of networks and transmitting a multicast message to at least one of said plurality of networks; and a protocol conversion processing unit for converting, in the case where the general purpose multicast message received by said transmit/receive processing unit is a multicast protocol message of a certain level, said multicast protocol message of the certain level into a multicast protocol message of another level, wherein a multicast address memory for storing a prefix portion of a multicast address of said other level, wherein in the case where the general purpose multicast message received by said transmit/receive processing unit is said multicast protocol message of the certain level in an OSI reference model, said protocol conversion processing unit rewrites a multicast address of said certain level in the received multicast message into a multicast address of said other level in the OSI reference model by use of the prefix portion of the corresponding multicast address in said multicast address memory.

6. An information relay device according to claim 5, further comprising a monitor processing unit for monitoring a multicast message of said other level on said networks to store the monitored multicast message of said other level into said multicast address memory.

7. An information relay device according to claim 5, wherein in the case where the general purpose multicast message received by said transmit/receive processing unit is a multicast protocol message of the second layer in an OSI reference model, said protocol conversion processing unit converts said multicast protocol message of the second layer into a multicast protocol message of the third layer and said transmit/receive processing unit transmits said multicast protocol message of the third layer to at least one of said plurality of networks.

8. An information relay device connected between a plurality of logical or physical networks for performing an operation for relay of information between said networks, comprising:

a transmit/receive processing unit for receiving a general purpose multicast message from one of said plurality of networks and transmitting a multicast message to at least one of said plurality of networks; and a protocol conversion processing unit for converting, in the case where the general purpose multicast message received by said transmit/receive processing unit is a multicast protocol message of a certain level, said multicast protocol message of the certain level into a multicast protocol message of another level, wherein the general purpose multicast message received by said transmit/receive processing unit is a multicast protocol message of the second or third layer in an OSI reference model, a multicast protocol of said second layer is GMRP (GARP Multicast Registration Protocol), and a multicast protocol of said third layer is IGMP (Internet Group Management Protocol), DVMRP (Distance Vector Multicast Routing Protocol), PIM-SM (Protocol-Independent Multicast-Sparse Mode), PIM-DM (Protocol-Independent Multicast-Dense Mode), MOSPF (Multicast Extension to OSPF), CBT (Core-Based Trees) or MLD (Multicast Listener Discovery) of IPv6.

9. An information relay device coupled to a plurality of logical or physical information networks for relaying a packet received from one of said plurality of information networks to another of said plurality of information networks, comprising:

a plurality of ports coupled to said plurality of information networks, respectively;

a first processing unit which receives a packet through one of said plurality of ports and transmits the received packet to one of said plurality of ports coupled to a destination one of said plurality of information networks;

a second processing unit which, when said first processing unit receives through one of said plurality of ports a multicast protocol message in a second layer of an Open System Interconnect (OSI) reference model, which is referred to as an L2 multicast protocol message, for requesting entering into or leaving from a multicast service, stores an L2 multicast address contained in said L2 multicast protocol message and said one of said plurality of ports receiving said L2 multicast protocol message so as to be associated to each other in a case where said received L2 multicast protocol message is a join message, and deletes said L2 multicast address contained in said L2 multicast protocol message among L2 multicast addresses stored in advance; and a conversion unit for converting said L2 multicast protocol message into a multicast protocol message in a third layer of the OSI reference model (hereinafter referred to an L3 multicast protocol message), wherein when said first processing unit receives said L2 multicast protocol message, said conversion unit converts said L2 multicast address contained in said L2 multicast protocol message into an L3 multicast address, converts a first type information contained within said L2 multicast protocol message and representing that said L2 multicast protocol message is a join message or a leave message into a second type information representing that said L3 multicast protocol message is a join message or a leave message, and generates said L3 multicast protocol message containing said converted L3 multicast address and said converted second type information.

10. An information relay device according to claim 9, further comprising:

a monitoring processing unit for monitoring whether said first processing unit has received an L3 multicast packet, and when it is monitored that said first processing unit has received the L3 multicast packet, extracting and holding a prefix address portion of an L3 multicast address contained in said received L3 multicast packet, wherein said conversion unit replaces a predetermined upper address portion of said L2 multicast address by said prefix portion held by said monitoring processing unit thereby to convert said L2 multicast address into said L3 multicast address.

11. An information relay device according to claim 9, wherein said first processing unit includes a relay unit which searches, when an L2 multicast packet is received, whether said second processing unit stores an L2 multicast address contained in said received L2 multicast packet, and, when said second processing unit stores the L2 multicast address contained in said received L2 multicast packet, relays said L2 multicast packet through one of said plurality of ports associated with said searched L2 multicast packet.

12. An information relay device according to claim 9, wherein a multicast protocol of said second layer is GMRP (GARP Multicast Registration Protocol), and a multicast protocol of said third layer is IGMP (Internet Group Management Protocol), DVMRP (Distance Vector Multicast Routing Protocol), PIM-SM (Protocol-Independent Multicast-Sparse Mode), PIM-DM (Protocol-Independent Multicast-Dense Mode), MOSPF (Multicast Extensions to OSPF), CBT (Core-Based Trees) or MLD (Multicast Listener Discovery) of IPv6.

13. An information relay device coupled to a plurality of logical or physical information networks for relaying a packet received from one of said plurality of information networks to another of said plurality of information networks, comprising:

a plurality of ports coupled to said plurality of information networks, respectively;

a first processing unit which receives a packet through one of said plurality of ports and transmits the received packet to one of said plurality of ports coupled to a destination one of said plurality of information networks;

a conversion unit for converting, when said first processing unit receives through one of said plurality of ports a multicast protocol message in a third layer of an OSI (Open Systems Interconnect) reference model, which is referred to as an L3 multicast protocol message, for requesting entering into or leaving from a multicast service, said L3 multicast protocol message into a multicast protocol message in a second layer of the OSI reference model, which is referred to as an L2 multicast protocol message; and a second processing unit which stores an L2 multicast address contained in said L2 multicast protocol message and said one of said plurality of ports receiving said L2 multicast protocol message so as to be associated to each other in a case where said received L2 multicast protocol message is a join message, and deletes said L2 multicast protocol message is a join message, and deletes said L2 multicast address contained in said L2 multicast protocol message among L2 multicast addresses stored in advance, wherein said conversion unit converts an L3 multicast address contained in said L3 multicast protocol message into an L2 multicast address, converts a first type information contained within said L3 multicast protocol message and representing that said L3 multicast protocol message is a join message or a leave message into a second type information representing that said L2 multicast protocol message is a join message or a leave message, and generates said L2 multicast protocol message containing said converted L2 multicast address and said converted second type information.

14. An information relay device according to claim 13, wherein said conversion unit replaces a first upper address portion of said L3 multicast address by a second upper address portion which address bit number differs from an address bit number of said first upper address portion thereby to convert said L3 multicast address into said L2 multicast address.

15. An information relay device according to claim 13, wherein said first processing unit includes a relay unit which searches, when an L2 multicast packet is received, whether said second processing unit stores an L2 multicast address contained in said receive L2 multicast packet, and, when said second processing unit stores the L2 multicast address contained in said received L2 multicast packet, relays said L2 multicast packet through one of said plurality of ports associated with said searched L2 multicast address.

16. An information relay device according to claim 13, wherein a multicast protocol of said second layer is GMRP (GARP Multicast Registration Protocol), and a multicast protocol of said third layer is IGMP (Internet Group Management Protocol), DVMRP (Distance Vector Multicast Routing Protocol), PIM-SM (Protocol-Independent Multicast-Sparse Mode), PIM-SM (Protocol-Independent Multicast-Dense Mode), MOSPF (Multicast Extensions to OSPF), CBT (Core-Based Trees) or MLD (Multicast Listener Discovery) of IPv6.

* * * * *